US006343936B1

(12) United States Patent
Kaufman et al.

(10) Patent No.: US 6,343,936 B1
(45) Date of Patent: Feb. 5, 2002

(54) SYSTEM AND METHOD FOR PERFORMING A THREE-DIMENSIONAL VIRTUAL EXAMINATION, NAVIGATION AND VISUALIZATION

(75) Inventors: Arie E. Kaufman, Plainview; Zhengrong Liang, Stony Brook; Mark R. Wax, Greenlawn; Ming Wan, Stony Brook; Dongqing Chen, Lake Ronkonkoma, all of NY (US)

(73) Assignee: The Research Foundation of State University of New York, Stony Brook, NY (US)

( * ) Notice: Subject to any disclaimer, the term of this patent is extended or adjusted under 35 U.S.C. 154(b) by 0 days.

(21) Appl. No.: 09/493,559

(22) Filed: Jan. 28, 2000

Related U.S. Application Data

(63) Continuation-in-part of application No. 09/343,012, filed on Jun. 29, 1999, which is a continuation-in-part of application No. 08/714,697, filed on Sep. 16, 1996, now Pat. No. 5,971,767.
(60) Provisional application No. 60/125,041, filed on Mar. 18, 1999.

(51) Int. Cl.[7] .......................... G09B 23/28; G06F 17/00
(52) U.S. Cl. .................. 434/262; 434/267; 434/272; 345/952; 345/959; 128/920; 128/922
(58) Field of Search .................. 434/262, 267, 434/272; 345/418, 419, 420, 424, 426, 952, 959; 128/920, 922, 923, 924

(56) References Cited

U.S. PATENT DOCUMENTS

| 4,751,643 A | 6/1988 | Lorensen et al. ............ 364/414 |
| 4,985,856 A | 1/1991 | Kaufman |
| 4,987,554 A | 1/1991 | Kaufman |
| 5,038,302 A | 8/1991 | Kaufman |
| 5,095,521 A | 3/1992 | Trousset et al. ............ 395/121 |
| 5,101,475 A | 3/1992 | Kaufman |
| 5,361,763 A | 11/1994 | Kao et al. |
| 5,442,733 A | 8/1995 | Kaufman et al. |
| 5,458,111 A | 10/1995 | Coin |
| 5,611,025 A | 3/1997 | Lorensen et al. |
| 5,623,586 A | 4/1997 | Höhne |
| 5,630,034 A | 5/1997 | Oikawa et al. |
| 5,699,799 A | 12/1997 | Xu et al. |
| 5,782,762 A | 7/1998 | Vining |

FOREIGN PATENT DOCUMENTS

| WO | 9613207 | 5/1996 |
| WO | 9811524 | 3/1998 |
| WO | 9837517 | 8/1998 |

OTHER PUBLICATIONS

Liang Z et al., "Inclusion of a priori information in segmentation of colon lumen for 3D virtual colonscopy", 1997 IEEE Nuclear Science Symposium Conference Record, pp. 1423–1427, vol. 2.

(List continued on next page.)

*Primary Examiner*—John Edmund Rovnak
(74) *Attorney, Agent, or Firm*—Baker Botts L.L.P.

(57) ABSTRACT

A system and method for generating a three-dimensional visualization image of an object such as an organ using volume visualization techniques and exploring the image using a guided navigation system which allows the operator to travel along a flight path and to adjust the view to a particular portion of the image of interest in order, for example, to identify polyps, cysts or other abnormal features in the visualized organ. An electronic biopsy can also be performed on an identified growth or mass in the visualized object. Improved fly-path generation and volume rendering techniques provide enhanced navigation through, and examination of, a region of interest.

16 Claims, 18 Drawing Sheets

OTHER PUBLICATIONS

Valev et al., "Techniques of CT colongraphy (virtual colonscopy)", Critical Reviews in Biomedical Engineering, 1999, Begall House, vol. 27, No. 1–2, pp. 1–25.

Shibolet O et al., "Coloring voxel–based objects for virtual endoscopy", IEEE Symposium on Volume Visualization, Research Triangle, Oct. 1998.

Kaye J. et al., "A 3D virtual environment for modeling mechanical cardiopulmonary interactions", CVRMED–M-RCAS '97, pp. 389–398, 1997.

Suya You et al., "Interactive volume rendering for virtual colonoscopy,", Proceedings Visualization '97, pp. 443–436, 571.

Pai D.K. et al., "Multiresolution Rough Terrain Motion Planning", IEEE Transactions on Robotics and Automation, vol. 14, No. 1, pp. 19–33, 1998.

Hagen H. et al., "Methods for Surface Interrogation", Proceedings of the Conference on Visulatization, vol. CONF 1, pp. 187–193, 1990.

Hong et al., "3D Virtual Colonoscopy," 1995 Biomedical Visualization Proceedings, pp. 26–32 and 83 (1995).

Hong et al., "3D Reconstruction and Visualization of the Inner Surface of the Colon from Spiral CT Data," IEEE, pp. 1506–1510 (1997).

William E. Lorensen, "The Exploration of Cross–Sectional Data with a Virtual Endoscope," Interactive Technology and the New Health Paradigm, IOS Press, pp. 221–230 (1995).

Adam L. Penenberg, "From Stony Brook, a New Way to Examine Colons, Externally," The New York Times, p. 6 (1996).

David J. Vining, "Virtual Colonoscopy," Advance for Admininstrators in Radiology, pp. 50–52 (1998).

Zhou et al., "Three–Dimensional Skeleton and Centerline Generation Based on an Approximate Minimum Distance Field," The Visual Computer, 14:303–314 (1998).

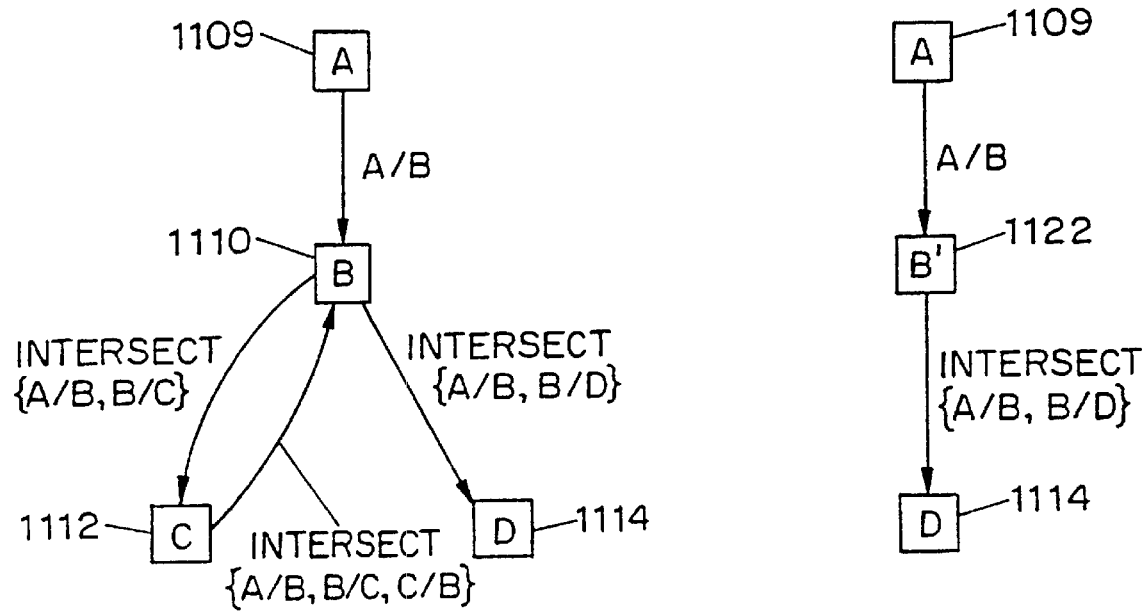
FIG. 11(b)
FIG. 11(c)
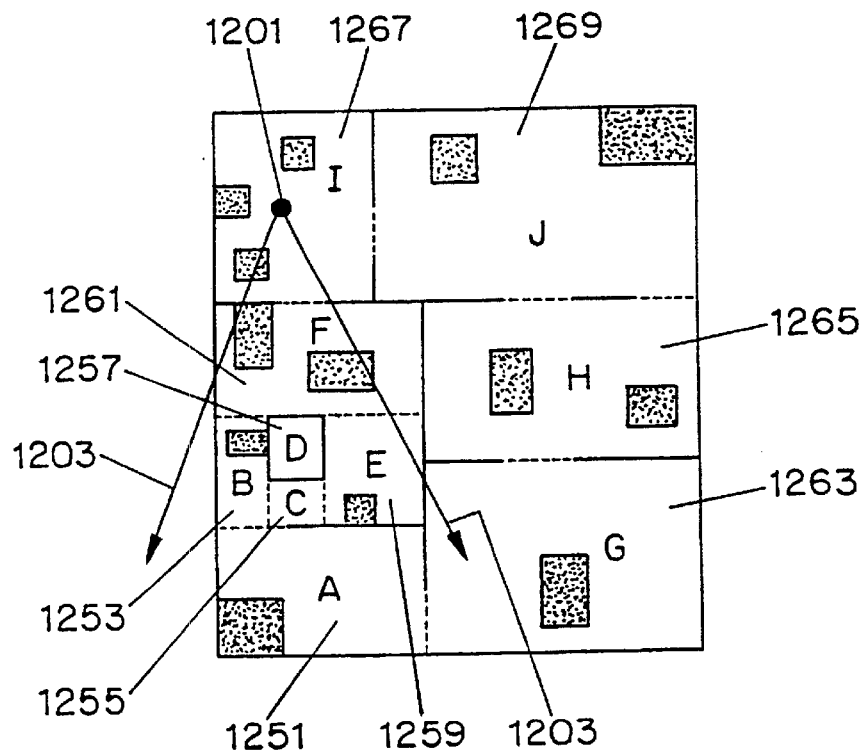
FIG. 12(a)

SYSTEM AND METHOD FOR PERFORMING A THREE-DIMENSIONAL VIRTUAL EXAMINATION, NAVIGATION AND VISUALIZATION

This application is a continuation-in-part of U.S. patent application, Ser. No. 09/343,012, filed on Jun. 29, 1999, entitled "System And Method For Performing a Three-dimensional Virtual Segmentation And Examination," which is a continuation in part of Ser. No. 8/714,697 filed Sep. 9, 1996, now U.S. Pat. No. 5,971,767, entitled "System and Method for Performing a Three Dimensional Virtual Examination," the present application also claims the benefit of United States Provisional Patent Application, Serial No. 60/125,041, filed on Mar. 18, 1999, entitled "Three Dimensional Virtual Examination."

TECHNICAL FIELD

The present invention relates to a system and method for performing a volume based three-dimensional virtual examination, and more particularly relates to a system which offers enhanced visualization and navigation properties.

BACKGROUND OF THE INVENTION

Colon cancer continues to be a major cause of death throughout the world. Early detection of cancerous growths, which in the human colon initially manifest themselves as polyps, can greatly improve a patient's chance of recovery. Presently, there are two conventional ways of detecting polyps or other masses in the colon of a patient. The first method is a colonoscopy procedure, which uses a flexible fiber-optic tube called a colonoscope to visually examine the colon by way of physical rectal entry with the scope. The doctor can manipulate the tube to search for any abnormal growths in the colon. The colonoscopy, although reliable, is both relatively costly in money and time, and is an invasive, uncomfortable painful procedure for the patient.

The second detection technique is the use of a barium enema and two-dimensional X-ray imaging of the colon. The barium enema is used to coat the colon with barium, and a two-dimensional X-ray image is taken to capture an image of the colon. However, barium enemas may not always provide a view of the entire colon, require extensive pre-treatment and patient manipulation, is often operator-dependent when performing the operation, exposes the patient to excessive radiation and can be less sensitive than a colonoscopy. Due to deficiencies in the conventional practices described above, a more reliable, less intrusive and less expensive way to check the colon for polyps is desirable. A method to examine other human organs, such as the lungs, for masses in a reliable, cost effective way and with less patient discomfort is also desirable.

Two-dimensional ("2D") visualization of human organs employing currently available medical imaging devices, such as computed tomography and MRI (magnetic resonance imaging), has been widely used for patient diagnosis. Three-dimensional images can be foncd by stacking and interpolating between two-dimensional pictures produced from the scanning machines. Imaging an organ and visualizing its volume in three-dimensional space would be beneficial due to its lack of physical intrusion and the case of data manipulation. However, the exploration of the three-dimensional volume image must be properly performed in order to fully exploit the advantages of virtually viewing an organ from the inside.

When viewing the three dimensional ("3D") volume virtual image of an environment, a functional model must be used to explore the virtual space. One possible model is a virtual camera which can be used as a point of reference for the viewer to explore the virtual space. Camera control in the context of navigation within a general 3D virtual environment has been previously studied. There are two conventional types of camera control offered for navigation of virtual space. The first gives the operator full control of the camera which allows the operator to manipulate the camera in different positions and orientations to achieve the view desired. The operator will in effect pilot the camera. This allows the operator to explore a particular section of interest while ignoring other sections. However, complete control of a camera in a large domain would be tedious and tiring, and an operator might not view all the important features between the start and finishing point of the exploration.

The second technique of camera control is a planned navigation method, which assigns the camera a predetermined path to take and which cannot be changed by the operator. This is akin to having an engaged "autopilot". This allows the operator to concentrate on the virtual space being viewed, and not have to worry about steering into walls of the environment being examined. However, this second technique does not give the viewer the flexibility to alter the course or investigate an interesting area viewed alone the flight path.

It would be desirable to use a combination of the two navigation techniques described above to realize the advantages of both techniques while minimizing their respective drawbacks. It would be desirable to apply a flexible navigation technique to the examination of human or animal organs which are represented in virtual 3D space in order to perform a non-intrusive painless thorough examination. The desired navigation technique would further allow for a complete examination of a virtual organ in 3D space by an operator allowing flexibility while ensuring a smooth path and complete examination through and around the organ. It would be additionally desirable to be able to display the exploration of the organ in a real time setting by using a technique which minimizes the computations necessary for viewing the organ. The desired technique should also be equally applicable to exploring any virtual object.

It is another object of the invention to assign opacity coefficients to each volume element in the representation in order to make particular volume elements transparent or translucent to varying degrees in order to customize the visualization of the portion of the object being viewed. A section of the object can also be composited using the opacity coefficients.

SUMMARY OF THE INVENTION

The invention generates a three-dimensional visualization image of an object such as a human organ using volume visualization techniques and explores the virtual image using a guided navigation system which allows the operator to travel along a predefined flight path and to adjust both the position and viewing angle to a particular portion of interest in the image away from the predefined path in order to identify polyps, cysts or other abnormal features in the organ.

In accordance with a navigation method for virtual examination, a fly-path through a virtual organ, such as a colon lumen, is generated. From the volume element representation of the colon lumen, volume shrinking from the wall of the virtual colon lumen is used to generate a compressed colon lumen data set. From the compressed colon lumen data set, a minimum distance path is generated between endpoints of the virtual colon lumen. Control points are then extracted along the minimum distance path along the length of the virtual colon lumen. The control points are then centered within the virtual colon lumen. Finally, a line is interpolated between the centered control points to define the final navigation fly-path.

In the above method for generating a fly-path, the step of volume shrinking can include the steps of representing the colon lumen as a plural stack of image data; applying a discrete wavelet transformation to the image data to generate a plurality of sub-data sets with components at a plurality of frequencies; and then selecting the lowest frequency components of the sub-data sets.

Another method for generating a fly-path through a virtual colon lumen during virtual colonoscopy includes the step of partitioning the virtual colon lumen into a number of segments. A point is selected within each segment and the points are centered with respect to a wall of the virtual colon lumen. The centered control points are then connected to establish the fly path.

A method for perfonring examination of a virtual colon lumen includes a volume rendering operation. For each view point within the colon lumen, rays are cast from the view point through each image pixel. The shortest distance from the view point to a wall of the colon lumen is detennined for each ray. If the distance exceeds a predetermined sampling interval, the processing effects a jump along the ray by the distance and assigns a value based on an open space transfer function to the points along the ray over the jumped distance. If the distance does not exceed the sampling interval, then the current points are sampled and displayable properties are determined according to a transfer function.

The methods of imaging and volume rendering also lend themselves to a method of performing virtual biopsy of a region, such as a colon wall or suspected mass. From a volume representation of a region which is derived from imaging scanner data, volume rendering is applied using an initial transfer function to the region for navigating the colon lumen and viewing the surface of the region. When a suspicious area is detected, dynamic alteration of the transfer function allows an operator, such as a physicians to selectively alter the opacity of the region and the composited information being viewed. This allows three dimensional viewing of interior structures of suspicious areas, such as polyps.

In yet another method in accordance with the present invention, polyps located on the surface of a region undergoing examination can be detected automatically.

The colon lumen is represented by a plurality of volume units. The surface of the colon lumen is further represented as a continuously second differentiable surface where each surface volume unit has an associated Gauss curvature. The Gauss curvatures can be searched and evaluated automatically for local features which deviate from the regional trend. Those local features corresponding to convex hill-like protrusions from the surface of the colon wall are then classified as polyps for further examination.

In a further method in accordance with the present virtual imaging invention, a method of performing virtual colonoscopy includes the step of acquiring an image data set of a region, including the colon, and converting the image data to volume units. Those volume units representing a wall of the colon lumen are identified and a fly-path path for navigating through the colon lumen is established. At least one transfer function is then used to map color and opacity coefficients to the wall of the colon lumen. The colon can then be displayed along the fly-path in accordance with the assigned transfer functions.

In the method of virtual colonoscopy, the step of generating a fly-path can include using volume shrinking from the wall of the virtual colon lumen to generate a reduced data set. From the reduced data set, a minimum distance path between endpoints of the virtual colon lumen is generated. Control points along a length of the virtual colon lumen can then be assigned alone the minimum distance path. The control points within the virtual colon lumen are then centered and a line connecting the centered control points is interpolated to complete the navigation fly-path.

Alternatively, a fly-path can be generated by partitioning the virtual colon lumen into a plurality of segments; selecting a point within each segment; centering each point with respect to the wall of the virtual colon lumen; and connecting the centered points to establish the fly-path.

A system for three dimensional imaging, navigation and examination of a region in accordance with the present invention includes an imaging scanner, such as an MRI or CT scanner, for acquiring image data. A processor converts the image data into a plurality of volume elements forming a volume element data set. The processor also performs the further steps of: identifying those volume units representing a wall of the colon lumen; establishing a fly-path for navigating through said colon lumen; and applying at least one transfer function to map color and opacities to the wall of the colon lumen. A display unit is operatively coupled to the processor for displaying a representation of the region in accordance with the fly-path and the at least one transfer function.

An alternate computer-based system for virtual examination, formed in accordance with an embodiment of the present invention, is based on a bus structure architecture. A scanner interface board is coupled to the bus structure and provides data from an imaging scanner to the bus. Main memory is provided which is also coupled to the bus. A volume rendering board having locally resident volume rendering memory recieves at least a portion of the data from the imaging scanner and stores this data in the volume rendering memory during a volume rendering operation. A graphics board is coupled to the bus structure and to a display device for displaying images from the system. A processor is operatively coupled to the bus structure and is responsive to the data from the imaging scanner. The processor converts the data from the imaging scanner into a volume element representation, stores the volume element representation in main memory, partitions the volume element representation into image slices, and transfers the volume element partitions to the volume rendering board.

BRIEF DESCRIPTION OF THE DRAWINGS

Further objects, features and advantages of the invention will become apparent from the following detailed description taken in conjunction with the accompanying figures showing a preferred embodiment of the invention, on which:

FIG. 11B is a graphical depiction of a stab tree generated when depicting the organ in FIG. 11A;

FIG. 11C is a further graphical depiction of a stab tree generated while depicting the organ in FIG. 11A;

FIG. 12A is a graphical depiction of a scene to be rendered with objects within certain cells of the scene;

FIG. 27 is a flow chart illustrating a method of perfoming volume imaging using the system of FIG. 26.

DETAILED DESCRIPTION OF PREFERRED EMBODIMENTS

While the methods and systems described in this application can be applied to any object to be examined, the preferred embodiment which will be described is the examination of an organ in the human body, specifically the colon. The colon is long and twisted which makes it especially suited for a virtual examination saving the patient both money and the discomfort and danger of a physical probe. Other examples of organs which can be examined include the lungs, stomach and portions of the gastro-intestinal system, the heart and blood vessels.

Figure 1:
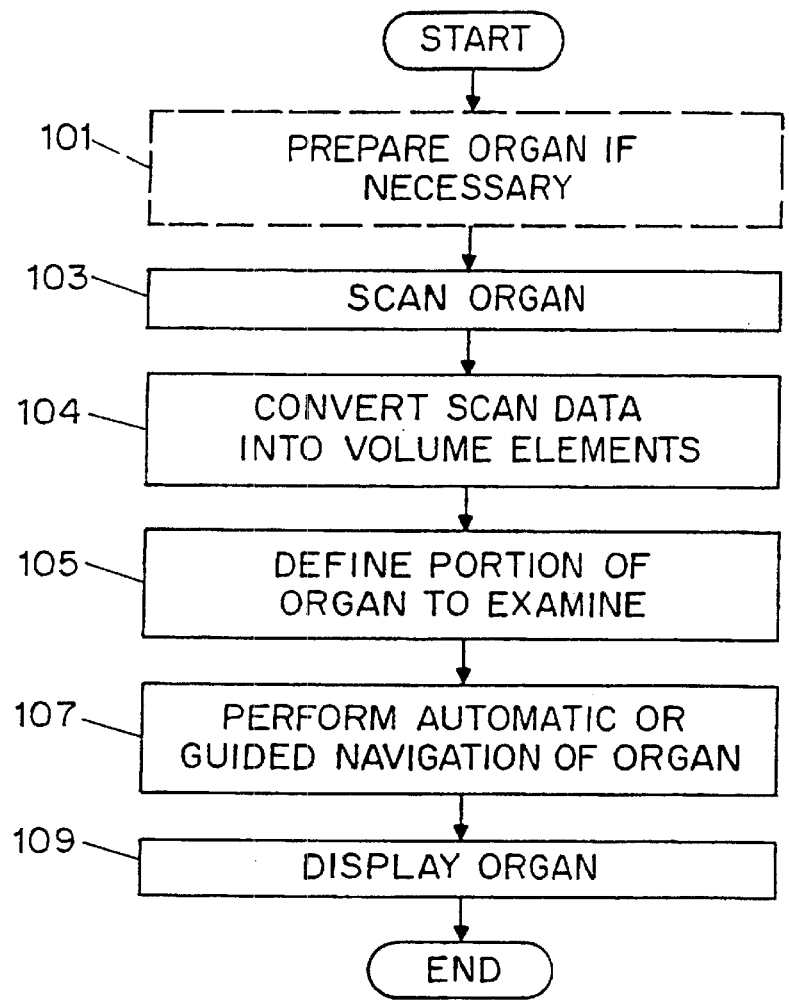
FIG. 1 is a flow chart of the steps for performing a virtual examination of an object, specifically a colon, in accordance with the invention.

FIG. 1 illustrates the steps necessary to perform a virtual colonoscopy using volume visualization techniques. Step 101 prepares the colon to be scanned in order to be viewed for examination if required by either the doctor or the particular scanning instrument. TIhis preparation could include cleansing the colon with a "cocktail" or liquid which enters the colon after being orally ingested and passed through the stomach. The cocktail forces the patient to expel waste material that is present in the colon. One example of a substance used is Golytcly. Additionally, in the case of the colon, air or $CO_2$ can be forced into the colon in order to expand it to make the colon easier to scan and examine. This is accomplished with a small tube placed in the rectum with approximately 1,000 cc of air pumped into the colon to distend the colon. Dependinig upon the type of scanner used, it may be necessary for the patient to drink a contrast substance such as barium to coat any unexpunged stool in order to distinguish the waste in the colon from the colon walls themselves. Alternatively, the method for virtually examining the colon can remove the virtual waste prior to or during the virtual examination as explained later in this specification. Step 101 does not need to be performed in all examinations as indicated by the dashed line in FIG. 1.

Step 103 scans the organ which is to be examined. The scanner can be an apparatus well known in the art, such as a spiral CT-scanner for scanning a colon or a Zenita MRI machine for scanning a lung labeled for example with xenon gas. The scanner must be able to take multiple images from different positions around the body during suspended respiration, in order to produce the data necessary for the volume Visualization. An example of a single CT-image would use an X-ray beam of 5 mm width, 1:1 to 2:1 pitch, with a 40 cm field-of-view being performed from the top of the splenic flexure of the colon to the rectum.

Discrete data representations of said object can be produced by other methods besides scanning. Voxel data representing an object can be derived from a geometric model by techniques described in U.S. Pat. No. 5,038,302 entitled "Method of Conveciting Continuous Three-Dimensional Geometrical Representations into Discrete Three- Dimensioiial Voxel-Based Representations Within a Three-Dimensionial Voxel-Based System" by Kaufman, issued Aug. 8, 1991, filed Jul. 26, 1988, which is hereby incorporated by reference. Additionally, data can be produced by a computer model of an image which can be converted to three-dimension voxels and explored in accordance with this invention. One example of this type of data is a computer simulation of the turbulence surrounding a space shuttle craft.

Step 104 converts the scanned images into three-dimensional volume elements (Voxels). In the preferred embodiment for examining a colon, the scan data is reformatted into 5 mm thick slices at increments of 1 mm or 2.5 mm and reconstructed in 1 mm slices, with each slice represented as a matrix of 512 by 512 pixels. By doing this, voxels of approximately 1 cubic mm are created. Thus a large number of 2D slices are generated depending upon the length of the scan. The set of 2D slices is then reconstructed to 3D voxels. The conversion process of 2D images from the scanner into 3D voxels can either be performed by the scanning machine itself or by a separate machine such as a computer with techniques which are well known in the art (for example, see U.S. Pat. No. 4,985,856 entitled "Method and Apparatus for Storing, Accessing, and Processing Voxel-based Data" by Kaufman et al.; issued Jan. 15, 1991, filed Nov. 11, 1988; which is hereby incorporated by reference).

Step 105 allows the operator to define the portion of the selected organ to be examined. A physician may be interested in a particular section of the colon likely to develop polyps. The physician can view a two dimensional slice overview map to indicate the section to be examined. A starting point and finishing point of a path to be viewed can be indicated by the physician/operator. A conventional computer and computer interface (e.g., keyboard, mouse or spaceball) can be used to designate the portion of the colon which is to be inspected. A grid system with coordiantes can be used for keyboard entry or the physician/operator can "click" on the desired points. The entire image of the colon can also be viewed if desired.

Step 107 performs the planned or guided navigation operation of the virtual organ being examined. Perfoming a guided navigation operation is defined as navigating through an environment along a predefined or automatically predetemined flight path which can be manually adjusted by an operator at any time. After the scan data has been converted to 3D voxels, the inside of the organ must be traversed from the selected start to the selected finishing point. The virtual examinations is modeled on having a tiny camera traveling through the virtual space with a lens pointing towards the finishing point. The guided navigation technique provides a level of interaction with the camera, so that the camera can navigate through a virtual environment automatically in the case of no operator interaction, and at the same time, allow the operator to manipulate the camera when necessary. The preferred embodiment of achieving, guided navigation is to use a physically based camera model which employs potential fields to control the movement of the camera and which are described in detail in FIGS. 2 and 3.

Figure 9:
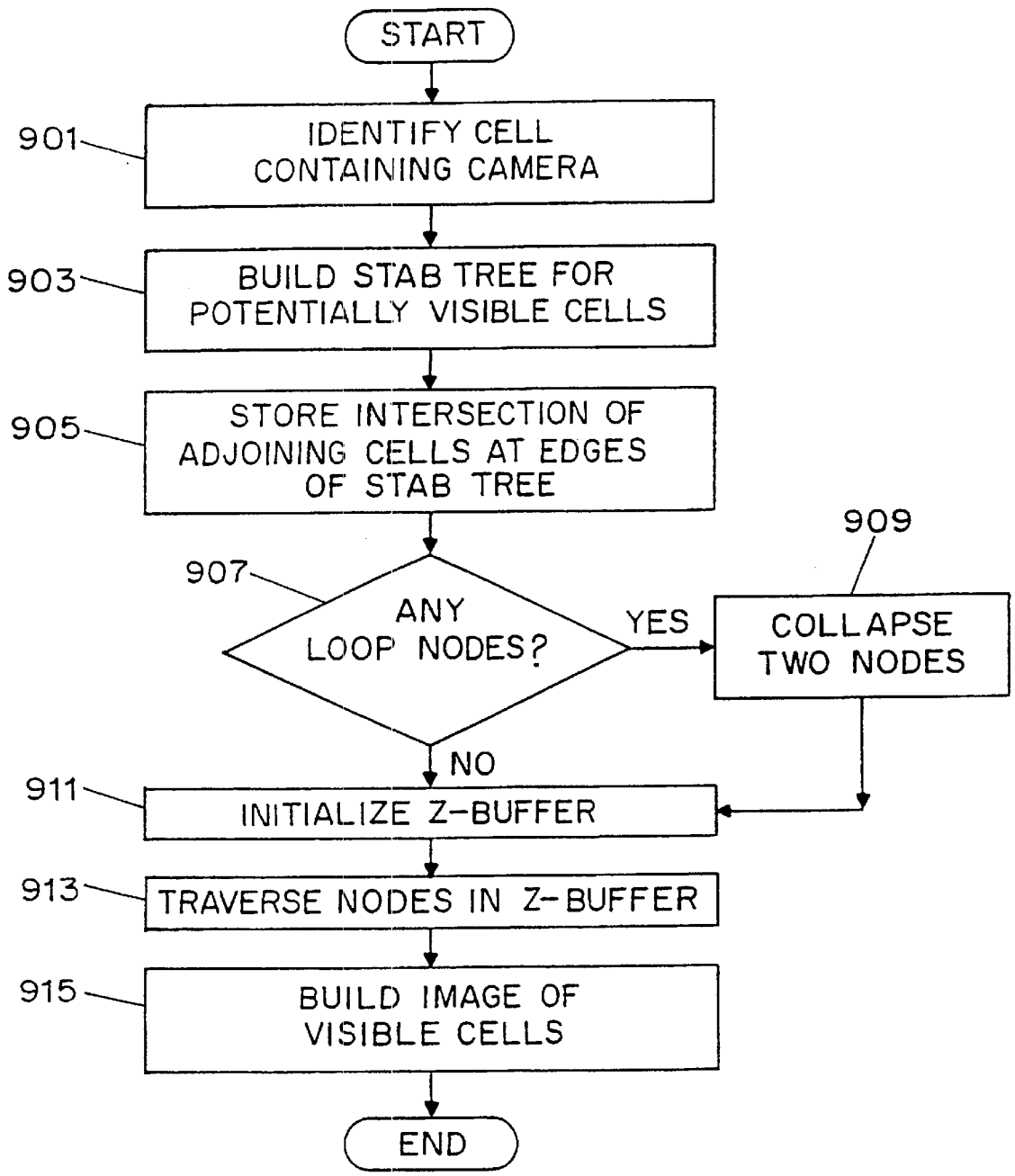
FIG. 9 is a flow chart of the steps of generating a volume visualization of the scanned organ.

Step 109, which can be performed concurrently with step 107, displays the iniside of the organ from the viewpoint of the camera model along the selected pathway of the guided navigation operation. Three-dimensional displays can be generated using techniques well known in the art such as the marching cubes technique. However, in order to produce a real time display of the colon, a technique is required which reduces the vast number of computations of data necessary for the display of the virtual organ. FIG. 9 describe this display step in more detail.

The method described in FIG. 1 can also be applied to scanning multiple organs in a body at the same time. For example, a patient may be examined for cancerous growths in both the colon and lungs. The method of FIG. 1 would be modified to scan all the areas of interest in step 103 and to select the current organ to be examined in step 105. For example the physician/operator may initially select the colon to virtually explore and later explore the lung. Alternatively, two different doctors with different specialties may virtually explore different scanned organs relating to their respective specialties. Following step 109, the next organ to be examined is selected and its portion will be defined and explored. This continues until all organs which need examination have been processed.

The steps described in conjunction with FIG. 1 can also be applied to the exploration of any object which can be represented by volume elements. For example, an architectural structure or inanimate object can be represented and explored in the same manner.

Figure 2:
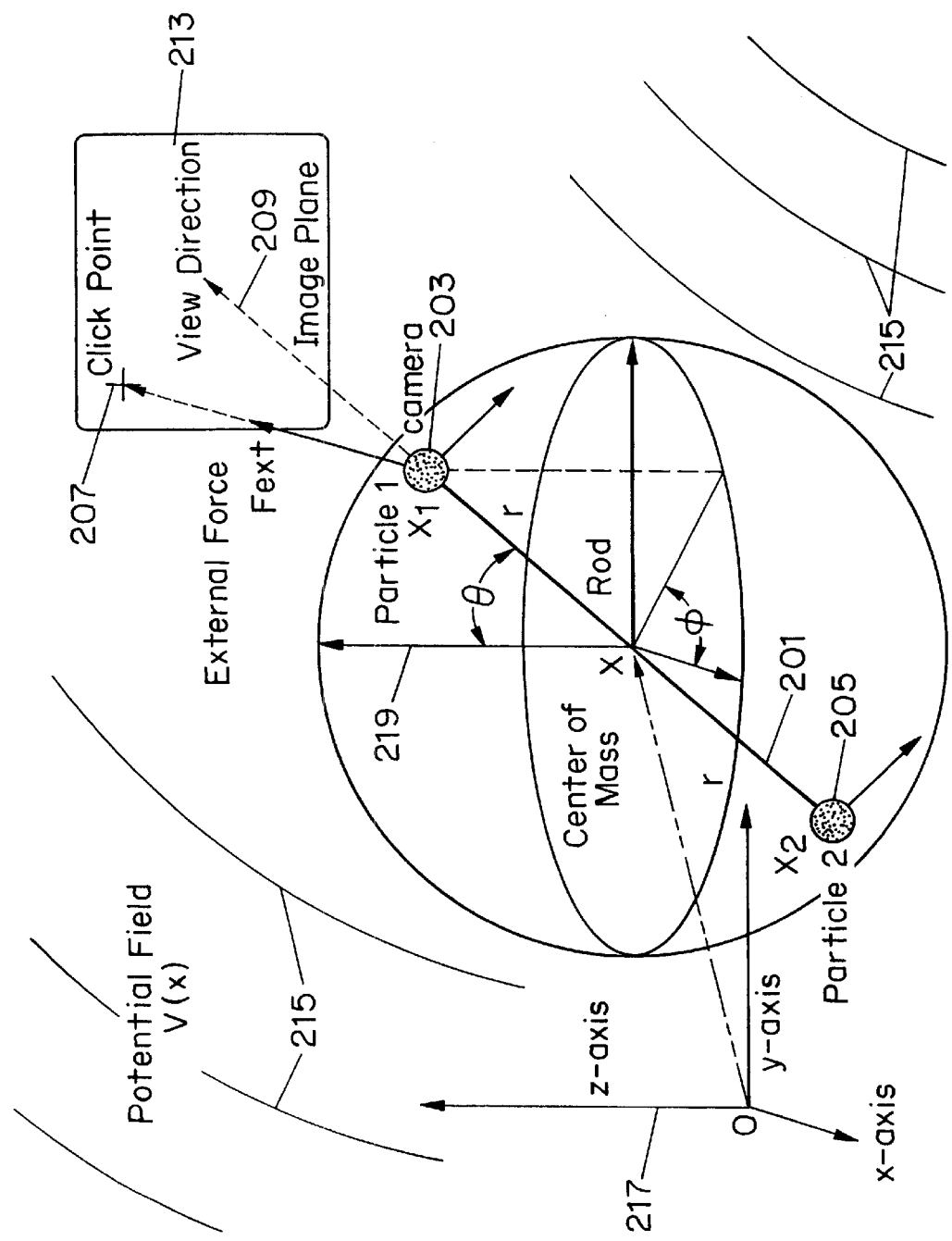
FIG. 2 is an illustration of a "submarine" camera model which performs guided navigation in the virtual organ.

FIG. 2 depicts a "submarine" camera control model which performs the guided navigation technique in step 107. When there is no operator control during guided navigation, the default navigation is similar to that of planned navigation which automatically directs the camera along a flight path from one selected end of the colon to another. During the planned navigation phase, the camera stays at the center of the colon for obtaining better views of the colonic surface. When an interesting region is encountered, the operator of the virtual camera using guided navigation can interactively bring the camera close to a specific region and direct the motion and angle of the camera to study the interesting area in detail, without unwillingly colliding with the walls of the colon. The operator can control the camera with a standard interface device such as a keyboard, mouse or non-standard device such as a spaceball. In order to fully operate a camera in a virtual environment, six degrees of freedom for the camera is required. The camera must be able to move in the horizontal, vertical, and Z direction (axes 217), as well as being able to rotate in another three degrees of freedom (axes 219) to allow the camera to move and scan all sides and angles of a virtual environment. The camera model for guided navigation includes an inextensible, weightless rod 201 connecting two particles $x_1$ 203 and $x_2$ 205, both particles being subjected to a potential field 215. The potential field is defined to be highest at the walls of the organ in order to push the camera away from the walls.

The positions of the particles are given by $x_1$ and $x_2$, and they are assumed to have the same mass m. A camera is attached at the head of the submarine $x_1$ 203, whose viewing direction coincides with $x_2x_1$. The submarine can perform translation and rotation around the center of mass x of the model as the two particles are affected by the forces from the potential field V(x) which is defined below, any friction forces, and any simulated external force. The relations between $x_1, x_2$, and x are as follows:

$$x=(x,y,z),$$

$$r=(r \sin \theta \cos \phi, r \sin \theta \sin \phi, r \sin \theta),$$

$$x_1=x+r,$$

$$x_2=x-r, \quad (1)$$

where r, θ and φ are the polar coordinates of the vector $xx_1$.

The kinetic energy of the model, T, is defined as the summation of the kinetic energies of the movements of $x_1$ and $x_2$:

$$T = \frac{m}{2}(\dot{x}_1^2 + \dot{x}_2^2) \quad (2)$$

$$= m\dot{x}^2 + m\dot{r}^2$$

$$= m(\dot{x}^2 + \dot{y}^2 + \dot{z}^2) + mr^2(\dot{\theta}^2 + \dot{\phi}^2 \sin^2\theta).$$

Then, the equations for the motion of the submarine model are obtained by using LaGrange's equation:

$$\frac{d}{dt}\left(\frac{\partial T}{\partial \dot{q}_j}\right) - \frac{\partial T}{\partial q_j} = \sum_{i=1}^{2}\left(F_i \cdot \frac{\partial x_i}{\partial q_j}\right), \quad (3)$$

where the $q_j$s are the generalized coordinates the model and can be considered as the variables of time t as:

$$(q_1, q_2, q_3, q_4, q_5, q_6) = (x, y, z, \theta, \Phi, \psi) = q(t), \quad (4)$$

with $\psi$ denoting the roll angle of our camera system, which will be explained later. The $F_i$s are called the generalized forces. The control of the submarine is perfoned by applying a simulated extemal force to $x_1$, $$F_{ext} = (F_x, F_t, F_z),$$

and it is assumed that both $x_1$ and $x_2$ are affected by the forces from the potential field and the frictions which act in the opposite direction of each particle's velocity. Consequently, the generalized forces are formulated as follows:

$$F_1 = -m\nabla V(x_1) - kx_1 + F_{ext},$$

$$F_2 = -m\nabla V(x_2) - kx_2, \quad (5)$$

where k denotes the friction coefficient of the system. The extenial force $F_{ext}$ is applied by the operator by simply clicking the mouse button in the desired direction 207 in the generated image, as shown in FIG. 2. This camera model would then be moved in that direction. This allows the operator to control at least five degrees of freedom of the camera with only a single click of the mouse button. From Equations (2), (3) and (5), it can be derived that the accelerations of the five parameters of our submarine model as:

$$\ddot{x} = -\frac{1}{2}\left(\frac{\partial V(x_1)}{\partial x} + \frac{\partial V(x_2)}{\partial x}\right) - \frac{k\dot{x}}{m} + \frac{F_x}{2m}, \quad (6)$$

$$\ddot{y} = -\frac{1}{2}\left(\frac{\partial V(x_1)}{\partial y} + \frac{\partial V(x_2)}{\partial y}\right) - \frac{k\dot{y}}{m} + \frac{F_y}{2m},$$

$$\ddot{z} = -\frac{1}{2}\left(\frac{\partial V(x_1)}{\partial z} + \frac{\partial V(x_2)}{\partial z}\right) - \frac{k\dot{z}}{m} + \frac{F_z}{2m},$$

$$\ddot{\theta} = \dot{\phi}^2 \sin\theta\cos\theta - \frac{1}{2r}\left[\cos\theta\left\{\cos\phi\left(\frac{\partial V(x_1)}{\partial x} - \frac{\partial V(x_2)}{\partial x}\right) + \sin\phi\left(\frac{\partial V(x_1)}{\partial y} - \frac{\partial V(x_2)}{\partial y}\right)\right\} - \sin\theta\left(\frac{\partial V(x_1)}{\partial z} - \frac{\partial V(x_2)}{\partial z}\right)\right] - \frac{k}{m}\dot{\theta} + \frac{1}{2mr}(F_x\cos\theta\cos\phi + F_y\cos\theta\sin\phi - F_x\sin\theta),$$

$$\ddot{\phi} = \frac{1}{\sin\theta}\left[-2\dot{\theta}\dot{\phi}\cos\theta - \frac{1}{2r}\left\{-\sin\phi\left(\frac{\partial V(x_1)}{\partial x} - \frac{\partial V(x_2)}{\partial x}\right) + \cos\phi\left(\frac{\partial V(x_1)}{\partial y} - \frac{\partial V(x_2)}{\partial y}\right)\right\} - \frac{k}{m}\dot{\phi}\sin\theta + \frac{1}{2mr}(-F_x\sin\phi + F_y\cos\phi)\right],$$

where $\dot{x}$ and $\ddot{x}$ denote the first and the second derivative of x, respectively, and $$\left(\frac{\partial V(x)}{\partial x}, \frac{\partial V(x)}{\partial y}, \frac{\partial V(x)}{\partial z}\right)$$

denotes the gradient of the potential at a point x. The terms $\dot{\phi}^2 \sin\theta \cos\theta$ of $\theta$ and $$-\frac{2\dot{\theta}\dot{\phi}\cos\theta}{\sin\theta}$$

of $\phi$ are called the centrifugal force and the Coriolis force, respectively, and they are concerned with the exchange of angular velocities of the submarine. Since the model does not have the moment of inertia defined for the rod of the submarine, these terms tend to cause an overflow of the numeric calculation of $\phi$. Fortunately, these terms become significant only when the angular velocities of the submarine model are significant, which essentially means that the camera moves too fast. Since it is meaningless to allow the camera to move so fast because the organ could not be properly viewed, these terms are minimized in our implementation to avoid the overflow problem.

From the first three formulas of Equation (6), it is known that the submarine cannot be propelled by the external force against the potential field if the following condition is satisfied:

$$|\nabla V(x_1) + \nabla V(x_2)| > \frac{|F_{ext}|}{m}.$$

Since the velocity of the submarine and the external force $F_{ext}$ have upper limits in our implementation, by assigning sufficiently high potential values at the boundary of the objects, it can be guaranteed that the submarine never bumps against the objects or walls in the environment.

Figure 3:
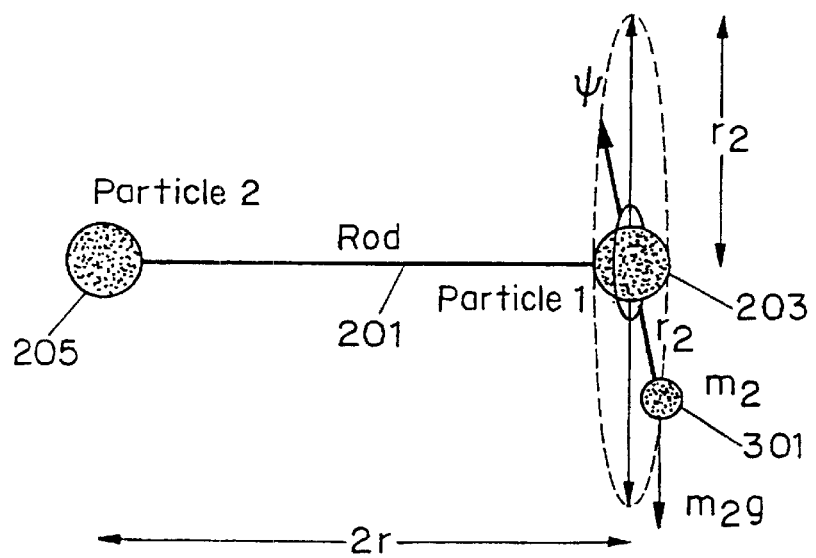
FIG. 3 is an illustration of a pendulum used to model pitch and roll of the "submarine" camera.

As mentioned previously, the roll angle $\psi$ of the camera system needs to be considered. One possible option allows the operator full control of the angle $\psi$. However, although the operator can rotate the camera freely around the rod of the model, he or she can easily become disoriented. The preferred technique assumes that the upper direction of the camera is connected to a pendulum with mass $m_2$ 301, which rotates freely around the rod of the submarine, as shown in FIG. 3. The direction of the pendulum, $r_2$, is expressed as:

$$r_2 = r_2(\cos\theta \cos\phi \sin\psi + \sin\Phi \cos\psi, \cos\theta \sin\phi \sin\psi - \cos\theta \cos\psi, -\sin\theta \sin\psi).$$

although it is possible to calculate the accurate movement of this pendulum along with the movement of the submarine, it makes the system equations too complicated. Therefore, it is assumed that all the generalized coordinates except the roll angle $\psi$ are constants, and thus define the independent kinetic energy for the pendulum system as:

$$T_p = \frac{m_2}{2}\dot{r}_2^2 = \frac{m_2 r_2^2}{2}\dot{\psi}^2.$$

This simplifies the model for the roll angle. Since it is assumed in this model that the gravitational force $$F_g = m_2 g = (m_2 g_x, m_2 g_y, m_2 g_z)$$

acts at the mass point $m_2$, the acceleration of $\psi$ can be derived using LaGrange's equation as:

$$\ddot{\psi} = \frac{1}{r_2}\{g_x(\cos\theta\cos\phi\cos\psi - \sin\phi\sin\psi) + \qquad (7)$$
$$g_y(\cos\theta\sin\phi\cos\psi + \cos\phi\sin\psi) +$$
$$g_z(-\sin\theta\cos\psi)\} - \frac{k_2}{m_2}\dot{\psi}.$$

From Equations (6) and (7), the generalized coordinates q(t) and their derivatives q(t) are calculated asymptotically by using Taylor series as:

$$q(t+h) = q(t) + h\dot{q}(t) + \frac{h^2}{2}\ddot{q}(t) + O(h^3),$$
$$\dot{q}(t+h) = \dot{q}(t) + h\ddot{q}(t) + O(h^2),$$

to freely move the submarine. To smooth the submarine's motion, the time step h is selected as an equilibrium value between being as small as possible to smooth the motion but as large as necessary to reduce computation cost.

Definition of the Potential Field

The potential field in the submarine model in FIG. 2 defines the boundaries (walls or other matter) in the virtual organ by assigning a high potential to the boundary in order to ensure that the submarine camera does not collide with the walls or other boundary. If the camera model is attempted to be moved into a high potential area by the operator, the camera model will be restrained from doing so unless the operator wishes to examine the organ behind the boundary or inside a polyp, for example. In the case of performing a virtual colonoscopy, a potential field value is assigned to each piece of volumetric colon data (volume element). When a particular region of interest is designated in step 105 of FIG. 1 with a start and finish point, the voxels within the selected area of the scanned colon are identified usling conventional blocking operations. Subsequently, a potential value is assigned to every voxel x of the selected volume based on the following three distance values: the distance from the finishing point dt(x), the distance from the colon surface ds(x) and the distance from the center-line of the colon space dc(x). dt(x) is calculated by using a conventional growing strategy. The distance from the colon surface, ds(x), is computed using a conventional technique of growing from the surface voxels inwards. To detemine dc(x), the center-line of the colon from the voxel is first extracted, and then dc(x) is computed using the conventional growing strategy from the center-line of the colon.

To calculate the center-line of the selected colon area defined by the user-specified start point and the user-specified finish point, the maximum value of ds(x) is located and denoted dmax. Thlen for each voxel inside the area of interest, a cost value of dmax−ds(x) is assigned. Thus the voxels which are close to the colon surface have high cost values and the voxels close to the center line have relatively low cost values. Then, based on the cost assignment, the single-source shortest path technique which is well known in the art is applied to efficiently compute a minimum cost path from the source point to the finish point. This low cost line indicates the center-line or skeleton of the colon section which is desired to be explored. This technique for determining the center-line is the preferred technique of the invention.

To compute the potential value V(x) for a voxel x inside the area of interest, the following formula is employed:

$$V(x) = C_1 d_t(x)^\mu + C_2 \left(\frac{d_s(x)}{d_c(x) + d_s(x)}\right)^{-\nu}, \qquad (8)$$

where $C_1$, $C_2$, $\mu$ and $\nu$ are constants chosen for the task. In order to avoid any collision between the virtual camera and the virtual colonic surface, a sufficiently large potential value is assigned for all points outside the colon. The gradient of the potential field will therefore become so significant that the submarine model camera will never collide with the colonic wall when being run.

Another technique to determine the center-line of the path in the colon is called the "peel-layer" technique and is shown in FIG. 4 through FIG. 8.

Figure 4:
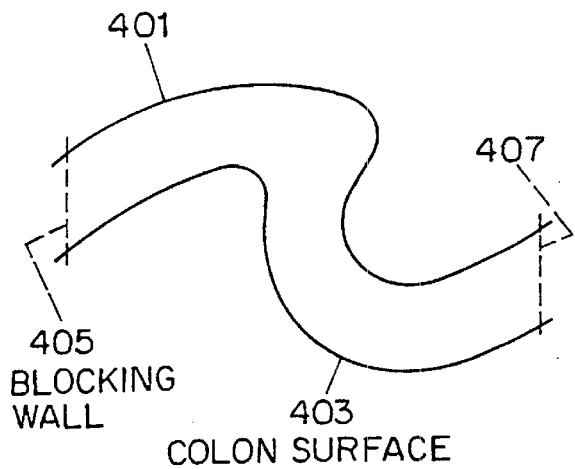
FIG. 4 is a diagram illustrating a two dimensional cross-section of a volumetric colon which identifies two blocking walls.

FIG. 4 shows a 2D cross-section of the volumetric colon, with the two side walls 401 and 403 of the colon being shown. Two blocking walls are selected by the operator in order to define the section of the colon which is of interest to examine. Nothing can be viewed beyond the blocking walls. This helps reduce the number of computations when displaying the virtual representation. The blocking walls together with side walls identify a contained volumetric shape of the colon which is to be explored.

Figure 5:
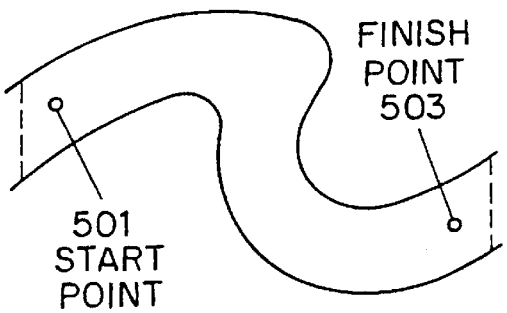
FIG. 5 is a diagram illustrating a two dimensional cross-section of a volumetric colon upon which start and finish volume elements are selected.

FIG. 5 shows two end points of the flight path of the virtual examination, the start volume element 501 and the finish volume element 503. The start and finish points are selected by the operator in step 105 of FIG. 1. The voxels between the start and finish points and the colon sides are identified and marked, as indicated by the area designated with "x"s in FIG. 6. The voxels are three-dimensional representations of the picture element.

Figure 6:
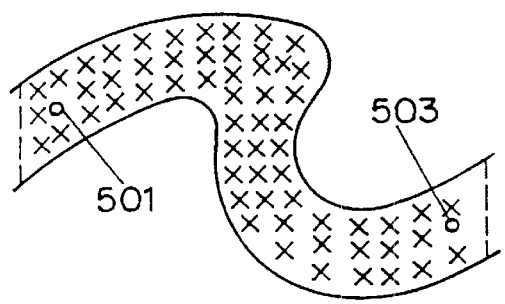
FIG. 6 is a diagram illustrating a two dimensional cross-section of a volumetric colon which shows a discrete sub-volume enclosed by the blocking walls and the colon surface.
Figure 7:
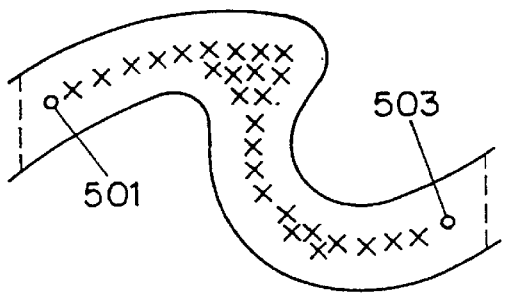
FIG. 7 is a diagram illustrating a two dimensional cross-section of a volumetric colon which has multiple layers peeled away.
Figure 8:
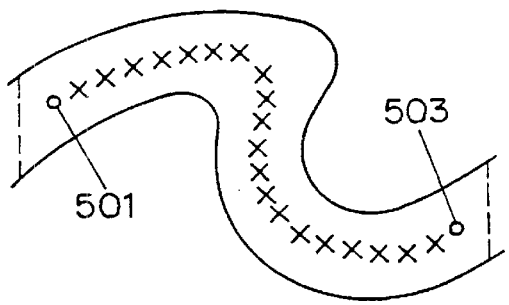
FIG. 8 is a diagram illustrating a two dimensional cross-section of a volumetric colon which contains the remaining flight path.

The peel-layer technique is then applied to the identified and marked voxels in FIG. 6. The outermost layer of all the voxels (closest to the colon walls) is peeled off step-by-step, until there is only one inner layer of voxels remaining. Stated differently, each voxel furthest away from a center point is removed if the removal does not lead to a disconnection of the path between the start voxel and the finish voxel. FIG. 7 shows the intermediate result after a number of iterations of peeling the voxels in the virtual colon are complete. The voxels closest to the walls of tle colon have been removed. FIG. 8 shows the final flight path for the camera model down the center of the colon after all the peeling iterations are complete. This produces essentially a skeleton at the center of the colon and becomes the desired flight path for the camera model.

Z-Buffer Assisted Visibility

FIG. 9 describes a real time visibility technique to display of virtual images seen by the camera model in the virtual three-dimensional volume representation of an organ. FIG. 9 shows a display technique using a modified Z buffer which corresponds to step 109 in FIG. 1. The number of voxels which could be possibly viewed from the camera model is extremely large. Unless the total number of elements (or polygons) which must be computed and visualized is reduced from an entire set of voxels in the scanned environment, the overall number of computations will make the visualization display process exceedingly slow for a large internal area. However, in the present invention only those images which are visible on the colon surface need to be computed for display. The scanned environment can be subdivided into smaller sections, or cells. The Z buffer technique then renders only a portion of the cells which are visible from the camera. The Z buffer technique is also used for three-dimensional voxel representations. The use of a modified Z buffer reduces the number of visible voxels to be computed and allows for the real time examination of the virtual colon by a physician or medical technician.

Figure 10:
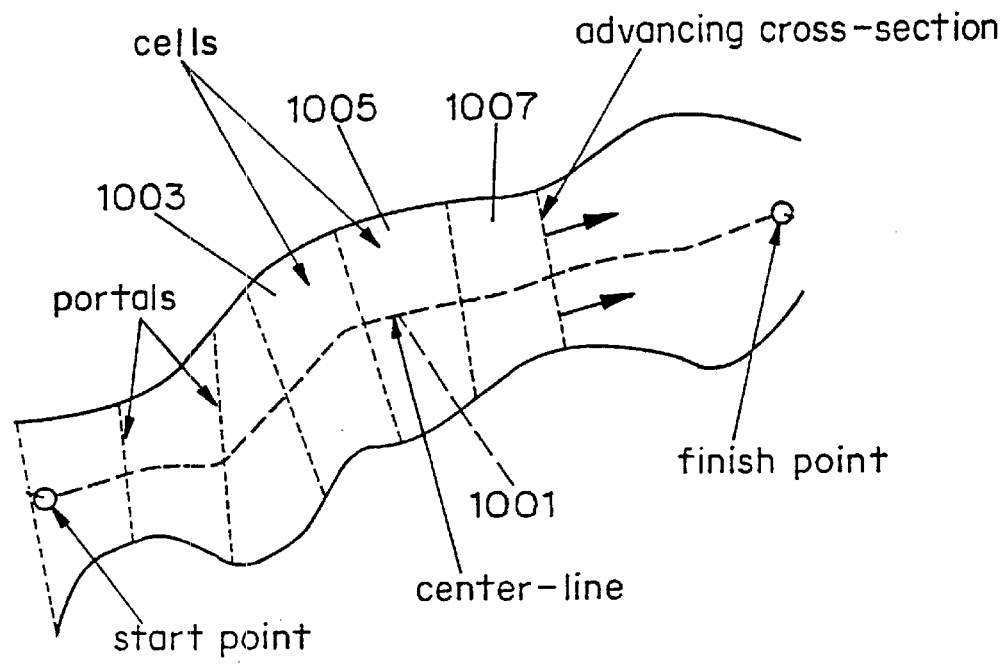
FIG. 10 is an illustration of a virtual colon which has been sub-divided into cells.

The area of interest from which the center-line has been calculated in step 107 is subdivided into cells before the display technique is applied. Cells are collective groups of voxels which become a visibility unit. Thie voxels in each cell will be displayed as a group. Each cell contains a number of portals through which the other cells can be viewed. The colon is subdivided by beginning at the selected start point and moving along the center-line 1001 towards the finish point. The colon is then partitioned into cells (for example, cells 1003, 1005 and 1007 in FIG. 10) when a predefined threshold distance along the center-path is reached. The threshold distance is based upon the specifications of the platform upon which the visualization technique is performed and its capabilities of storage and processing. The cell size is directly related to the number of voxels which can be stored and processed by the platform. One example of a threshold distance is 5 cm, although the distance can greatly vary. Each cell has two cross-section as portals for viewing outside of the cell as shown in FIG. 10.

Step 901 in FIG. 9 identifies the cell within the selected organ which currently contains the camera. The current cell will be displayed as well as all other cells which are visible given the orientation of the camera. Step 903 builds a stab tree (tree diagram) of hierarchical data of potentially visible cells from the camera (through defined portals), as will be described in further detail hereinbelow. The stab tree contains a node for every cell which may be visible to the camera. Some of the cells may be transparent without any blocking bodies present so that more than one cell will be visible in a single direction. Step 905 stores a subset of the voxels from a cell which include the interiscctioin of adjolining cell edges and stores them at the outside edge of the stab tree in order to more efficiently determine which cells are visible.

Step 907 checks if any loop nodes are present in the stab tree. A loop node occurs when two or more edges of a single cell both border on the same nearby cell. This may occur when a single cell is surrounded by another cell. If a loop node is identified in the stab tree, the method continues with step 909. If there is no loop node, the process goes to step 911.

Step 909 collapses the two cells making up the loop node into one large node. The stab tree is then corrected accordingly. This eliminates the problem of viewing the same cell twice because of a loop node. The step is performed on all identified loop nodes. The process then continues with step 911.

Step 911 then initiates the Z-buffer with the largest Z value. The Z value defines the distance away from the camera along the skeleton path. The tree is then traversed to first check the intersection values at each node. If a node intersection is covered, meaning that the current poital sequence is occluded (which is detennined by the Z buffer test), then the traversal of the current branch in the tree is stopped. Step 913 traverses each of the branches to check if the nodes are covered and displays them if they are not.

Step 915 then constructs the image to be displayed on the operator's screen from the volume elements within the visible cells identified in step 913 using one of a variety of techniques known in the art, such as volume rendering by compositing. The only cells shown are those which are identified as potentially visible. This technique limits the number of cells which requires calculations in order to achieve a real time display and correspondingly increases the speed of the display for better performance. This technique is an improvement over prior techniques which calculate all the possible visible data points whether or not they are actually viewed.

Figure 11A:
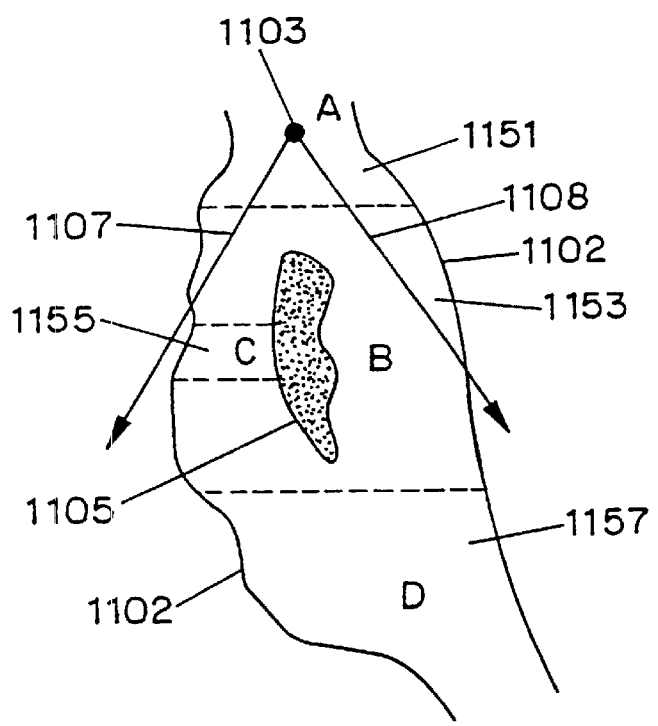
FIG. 11A is a graphical depiction of an organ which is being virtually examined.

FIG. 11A is a two dimensional pictorial representation of an organ which is being explored by guided navigation and needs to be displayed to an operator. Organ 1101 shows two side walls 1102 and an object 1105 in the center of the pathway. The organ has been divided into four cells A 1151, B 1153, C 1155 and D 1157. The camera 1103 is facing towards cell D 1157 and has a field of vision defined by vision vectors 1107, 1108 which can identify a cone-shaped field. The cells which can be potentially viewed are cells B 1153, C 1155 and D 1157. Cell C 1155 is completely surrounded by Cell B and thus constitutes a node loop.

FIG. 11B is a representation of a stab tree built from the cells in FIG. 11A. Node A 1109 which contains the camera is at the root of the tree. A sight line or sight cone, which is a visible path without being blocked, is drawn to node B 1110. Node B has direct visible sight lines to both node C 1112 and node D 1114 and which is shown by the connecting arrows. The sight line of node C 1112 in the direction of the viewing camera combines with node B 1110. Node C 1112 and node B 1110 will thus be collapsed into one large node B' 1122 as shown in FIG. 11C.

FIG. 11C shows node A 1109 containing the camera adjacent to node B' 1122 (containing both nodes B and node C) and node D 1114. The nodes A, B' and D will be displayed at least partially to the operator.

Figure 12B:
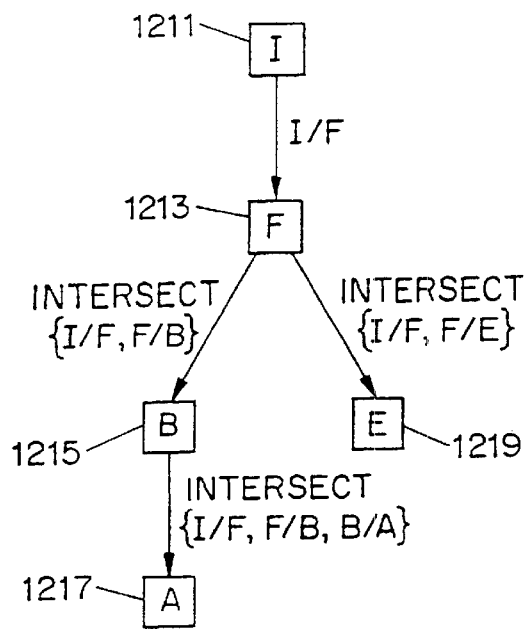
FIG. 12B is a graphical depiction of a stab tree generated while depicting the scene in FIG. 12A.

FIGS. 12A–12E illustrate the use of the modified Z buffer with cells that contain objects which obstruct the views. An object could be some waste material in a portion of the virtual colon. FIG. 12A shows a virtual space with 10 potential cells: A 1251, B 1253, C 1255, D 1257, E 1259, F 1261, G 1263, H 1265, I 1267 and J 1269. Some of the cells contain objects. If the camera 1201 is positioned in cell I 1267 and is facing toward cell F 1261 as indicated by the vision vectors 1203, then a stab tree is generated in accordance with the technique illustrated by the flow diagram in FIG. 9. FIG. 12B shows the stab tree generated with the intersection nodes showing for the virtual representation as shown in FIG. 12A. FIG. 12B shows cell I 1267 as the root node of the tree because it contains the camera 1201. Node I 1211 is pointing to node F 1213 (as indicated with an arrow), because cell F is directly connected to the sight line of the camera. Node F 1213 is pointing to both node B 1215 and node E 1219. Node B 1215 is pointing to node A 1217. Node C 1202 is completely blocked from the line of sight by camera 1201 so is not included in the stab tree.

Figure 12C:
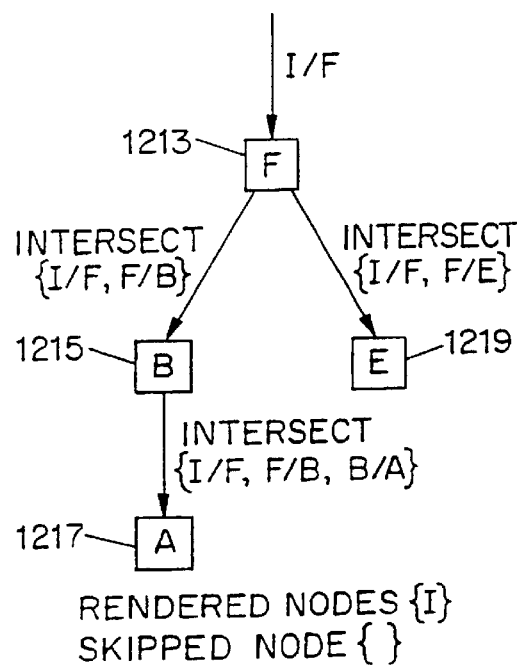
FIGS. 12C–12E are further graphical depictions of stab trees generated while depicting the image in FIG. 12A.
Figure 12D:
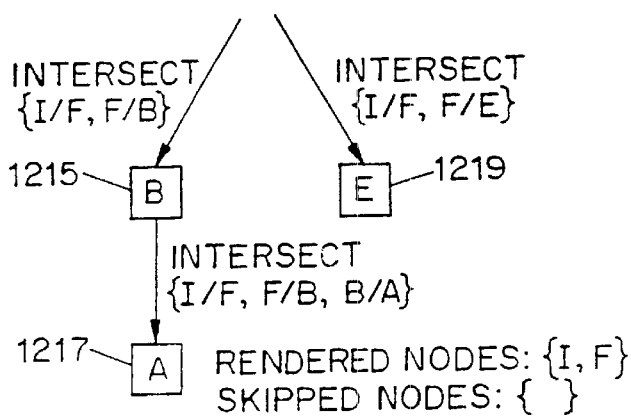

FIG. 12C shows the stab tree after node I 1211 is rendered on the display for the operator. Node I 1211 is then removed from the stab tree because it has already been displayed and node F 1213 becomes the root. FIG. 12D shows that node F 1213 is now rendered to join node I 1211. The next nodes in the tree connected by arrows are then checked to see if they are already covered (already processed). In this example, all of the intersected nodes from the camera positioned in cell I 1267 has been covered so that node B 515 (and therefore dependent node A) do not need to be rendered on the display.

Figure 12E:
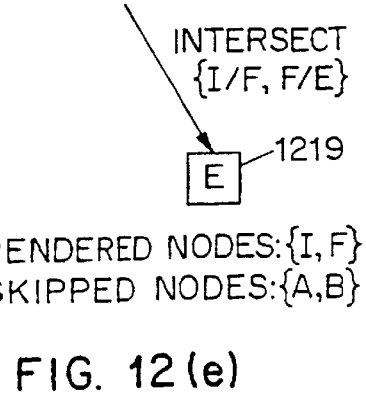

FIG. 12E shows node E 515 being checked to determine if its intersection has been covered. Since it has, the only rendered nodes in this example of FIG. 12A–12E are nodes I and F while nodes A, B and E are not visible and do not need to have their cells prepared to be displayed.

The modified Z buffer technique described in FIG. 9 allows for fewer computations and can be applied to an object which has been represented by voxels or other data elements, such as polygons.

Figure 13:
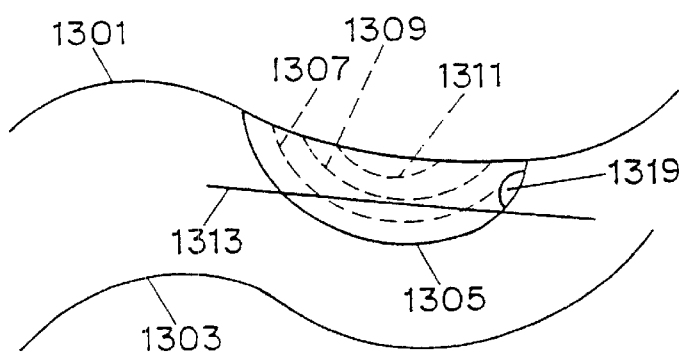
FIG. 13 is a two dimensional representation of a virtual colon containing a polyp whose layers can be removed.

FIG. 13 shows a two dimensional virtual view of a colon with a large polyp present along one of its walls. FIG. 13 shows a selected section of a patient's colon which is to be examined further. The view shows two colon walls 1301 and 1303 with the growth indicated as 1305. Layers 1307, 1309, and 1311 show inner layers of the Growth. It is desirable for a physician to be able to peel the layers of the polyp or tumor away to look inside of the mass for any cancerous or other harmful material. This process would in effect perform a virtual biopsy of the mass without actually cutting into the mass. Once the colon is represented virtually by voxels, the process of peeling away layers of an object is easily performed in a similar manner as described in conjunction with FIGS. 4 through 8. The mass can also be sliced so that a particular cross-section can be examined. In FIG. 13, a planar cut 1313 can be made so that a particular portion of the growth can be examined. Additionally, a user-defined slice 1319 can be made in any manner in the growth. The voxels 1319 can either be peeled away or modified as explained below.

A transfer function can be performed to each voxel in the area of interest which can make the object transparent, semi-transparent or opaque by altering coefficients representing the translucently for each voxel. An opacity coefficient is assigned to each voxel based on its density. A mapping function then transforms the density value to a coefficient representing its translucency. A high density scanned voxel will indicate either a wall or other dense matter besides simply open space. An operator or program routine could then change the opacity coefficient of a voxel or group of voxels to make them appear transparent or semi-transparent to the submarine camera model. For example, an operator may view a tumor within or outside of an entire growth. Or a transparent voxel will be made to appear as if it is not present for the display step of FIG. 9. A composite of a section of the object can be created using a weighted average of the opacity coefficients of the voxels in that section.

If a physician desires to view the various layers of a polyp to look for a cancerous areas, this can be performed by removing the outer layer of polyp 1305 yielding a first layer 1307. Additionally, the first inner layer 1307 can be stripped back to view second inner layer 1309. The second inner layer can be stripped back to view third inner layer 1311, etc. The physician could also slice the polyp 1305 and view only those voxels within a desired section. The slicing area can be completely user-defined.

Adding an opacity coefficient can also be used in other ways to aid in the exploration of a virtual system. If waste material is present and has a density as other properties within a certain known range, the waste can be made transparent to the virtual camera by changing its opacity coefficient during the examination. This will allow the patient to avoid ingesting a bowel cleansing agent before the procedure and make the examination faster and easier. Other objects can be similarly made to disappear depending upon the actual application. Additionally, some objects like polyps could be enhanced electronically by a contrast agent followed by a use of an appropriate transfer function.

Figure 14:
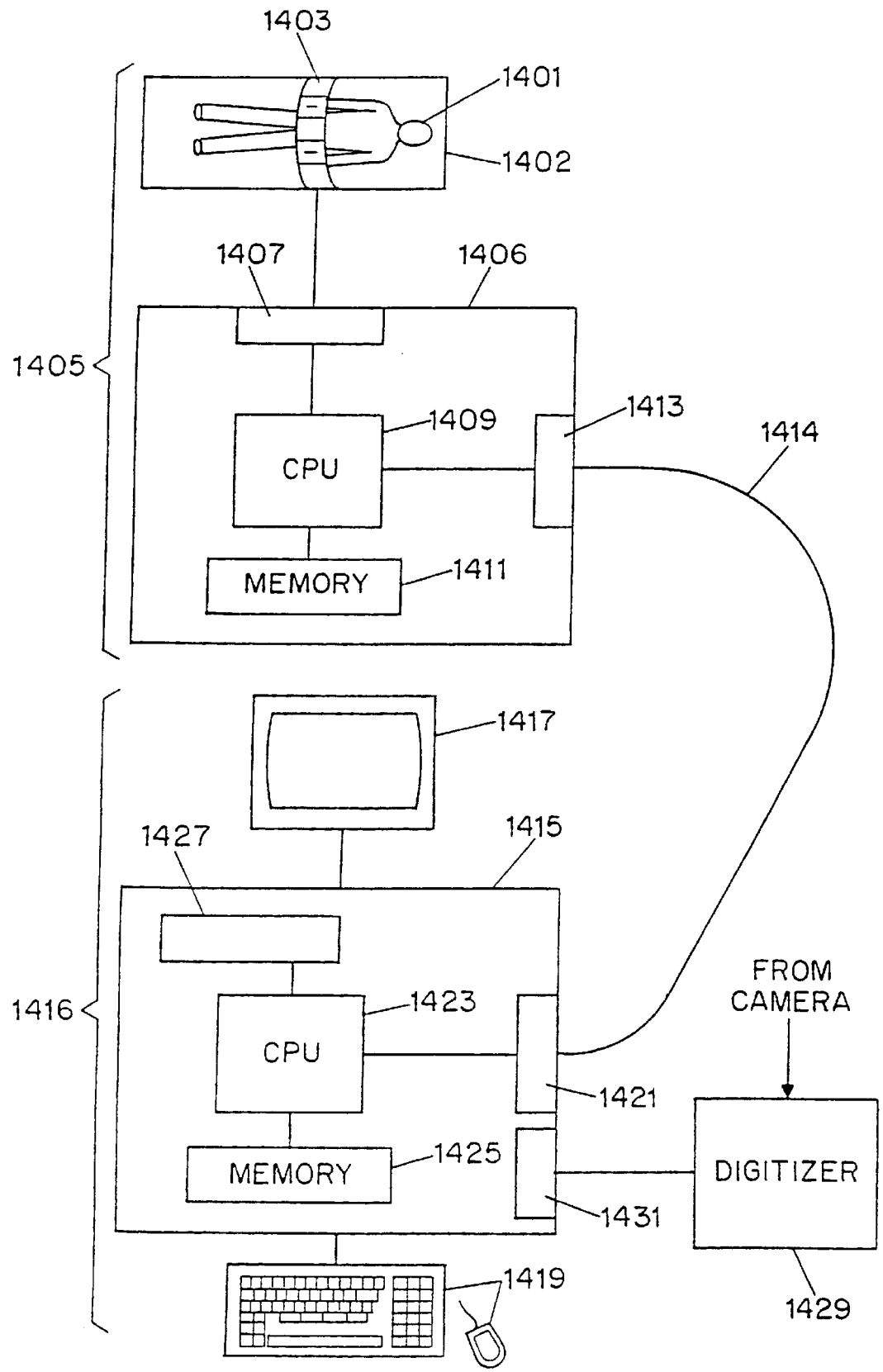
FIG. 14 is a diagram of a system used to perform a virtual examination of a human organ in accordance with the invention.

FIG. 14 shows a system for performing, the virtual examination of an object such as a human organ using the techniques described in this specification. Patient 1401 lies down on a platform 1402 while scanning device 1405 scans the area that contains the organ or organs which are to be examined. The scanning device 1405 contains a scanning portion 1403 which actually takes images of the patient and an electronics portion 1406. Electronics portion 1406 comprises an interface 1407, a central processing unit 1409, a memory 1411 for temporarily storing the scanning data, and a second interface 1413 for sending data to the virtual navigation platform. Interface 1407 and 1413 could be included in a single interface component or could be the same component. The components in portion 1406 are connected together with conventional connectors.

In system 1400, the data provided from the scanning portion of device 1403 is transferred to portion 1405 for processing and is stored in memory 1411. Central processing unit 1409 converts the scanned 2D data to 3D voxel data and stores the results in another portion of memory 1411. Alternatively, the converted data could be directly sent to interface unit 1413 to be transferred to the virtual navigation terminal 1416. The conversion of the 2D data could also take place at the virtual navigation tenninal 1416 after being transmitted from interface 1413. In the preferred embodiment, the converted data is transmitted over carrier 1414 to the virtual navigation terminal 1416 in order for an operator to perform the virtual examination. The data could also be transported in other conventional ways such as storing the data on a storage medium and physically transporting it to terminal 1416 or by using satellite transmissions.

The scanned data may not be converted to its 3D representation until the visualization rendering engine requires it to be in 3D form. This saves computational steps and memory storage space.

Virtual navigation terminal 1416 includes a screen for viewing the virtual organ or other scanned image, an electronics portion 1415 and interface control 1419 such as a keyboard, mouse or spaceball. Electronics portion 1415 comprises a interface port 1421, a central processing unit 1423, other components 1427 necessary to run the terminal and a memory 1425. The components in terminal 1416 are connected together with conventional connectors. The converted voxel data is received in interface port 1421 and stored in memory 1425. The central processor unit 1423 then assembles the 3D voxels into a virtual representation and runs the submarine camera model as described in FIGS. 2 and 3 to perform the virtual examination. As the submarine camera travels through the virtual organ, the visibility technique as described in FIG. 9 is used to compute only those areas which are visible from the virtual camera and displays them on screen 1417. A graphics accelerator can also be used in generating the representations. The operator can use interface device 1419 to indicate which portion of the scanned body is desired to be explored. The interface device 1419 can further be used to control and move the submarine camera as desired as discussed in FIG. 2 and its accompanying description. Terminal portion 1415 can be the Cube-4 dedicated system box, generally available from the Department of Computer Science at the State University of New York at Stony Brook.

Scanning device 1405 and terminal 1416, or parts thereof, can be part of the same unit. A single platform would be used to receive the scan image data, connect it to 3D voxels if necessary and perform the guided navigation.

An important feature in system 1400 is that the virtual organ can be examined at a later time without the presence of the patient. Additionally, the virtual examination could take place while the patient is being scanned. The scan data can also be sent to multiple terminals which would allow more than one doctor to view the inside of the organ simultaneously. Thus a doctor in New York could be looking at the same portion of a patient's organ at the same time with a doctor in California while discussing the case. Alternatively, the data can be viewed at different times. Two or more doctors could perform their own examination of the same data in a difficult case. Multiple virtual navigation terminals could be used to view the same scan data. By reproducing the organ as a virtual organ with a discrete set of data, there are a multitude of benefits in areas such as accuracy, cost and possible data manipulations.

The above described techniques can be further enhanced in virtual colonoscopy applications through the use of an improved electronic colon cleansing technique which employs modified bowel preparation operations followed by image segmentation operations, such that fluid and stool remaining in the colon during a computed tomographic (CT) or magnetic resonance imaging (MRI) scan can be detected and removed from the virtual colonoscopy images. Through the use of such techniques, conventional physical washing of the colon, and its associated inconvenience and discomfort, is minimized or completely avoided.

Figure 15:
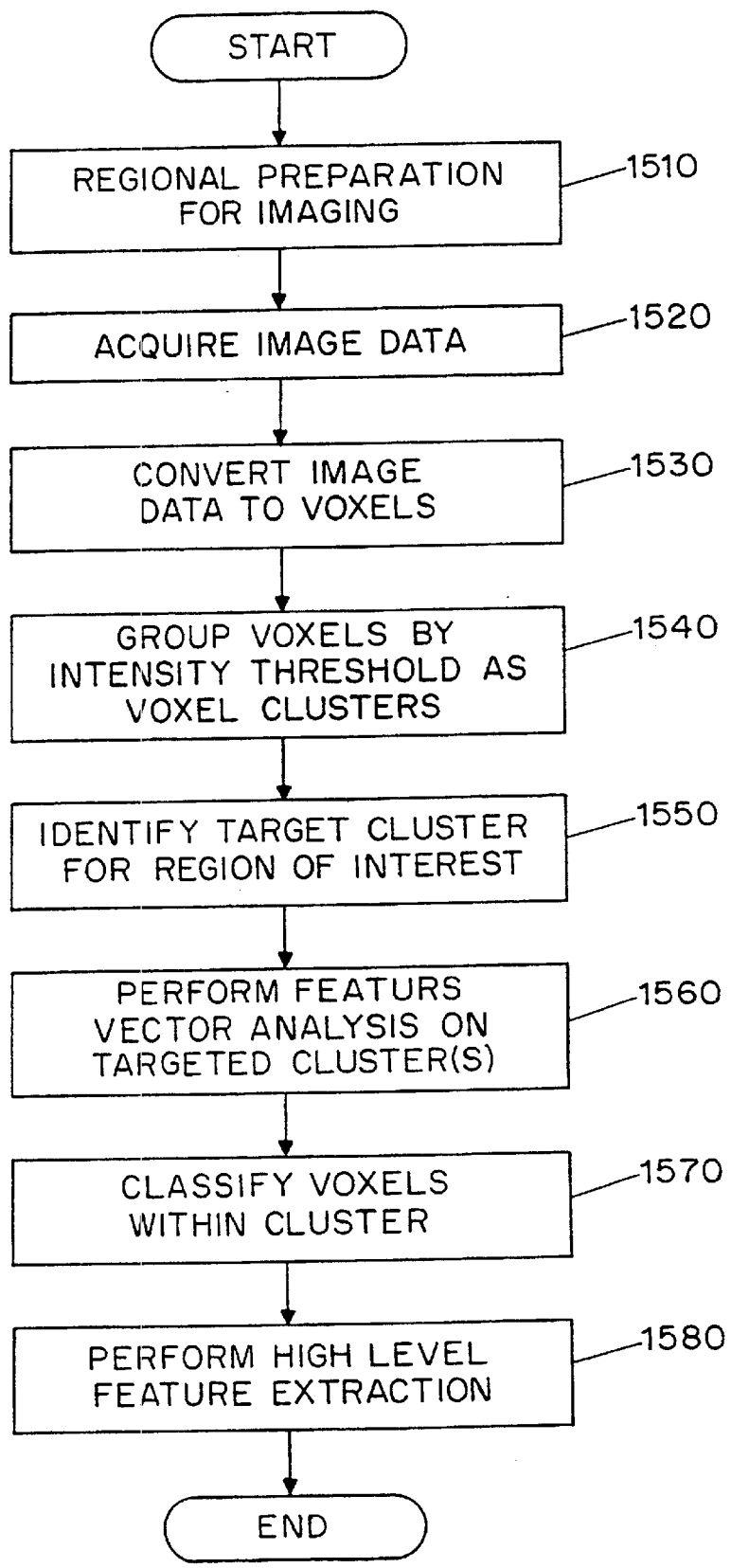
FIG. 15 is a flow chart depicting an improved image segmentation method.

Referring to FIG. 15, the first step in electronic colon cleansing is bowel preparation (step 1510), which takes place prior to conducting the CT or magnetic resonance imaging (MRI) scan and is intended to create a condition where residual stool and fluid remaining in the colon present significantly different image properties from that of the gas-filled colon interior and colon wall. An exemplary bowel preparation operation includes ingesting three 250 cc doses of Barium Sulfate suspension of 2.1% W/V, such as manufactured by E-Z-EM, Inc., of Westbury, N.Y., during the day prior the CT or MRI scan. The three doses should be spread out over the course of the day and can be ingested along with three meals, respectively. The Barium Sulfate serves to enhance the images of any stool which remains in the colon. In addition to the intake of Barium Sulfate, fluid intake is preferably increased during the day prior to the CT or MRI scan. Cranberry juice is known to provide increased bowel fluids and is preferred, although water can also be ingested. In both the evening prior to the CT scan and the morning of the CT scan, 60 ml of a Diatrizoate Meglumine and Diaztrizoate Sodium Solution, which is commercially available as MD-Gastroview, manufactured by Mallinckrodt, Inc. of St. Louis, Mo., can be consumed to enhance image properties of the colonic fluid. Sodium phosphate can also be added to the solution to liquidize the stool in the colon, which provides for more uniform enhancement of the colonic fluid and residual stool.

The above described exemplary preliminary bowel preparation operation can obviate the need for conventional colonic washing protocols, which can call for the ingestion of a gallon of Golytely solution prior to a CT scan.

Just prior to conducting the CT scan, an intravenous injection of 1 ml of Glucagon, manufactured by Ely Lily and Company, of Indianapolis, Ind. can be administered to minimize colon collapse. Then, the colon can be inflated using approximately 1000 cc of compressed gas, such as $CO_2$, or room air, which can be introduced through a rectum tube. At this point, a conventional CT scan is performed to acquire data from the region of the colon (step 1520). For example, data can be acquired using a GE/CTI spiral mode scanner operating in a helical mode of 5 mm, 1.5–2.0:1 pitch, reconstructed in 1 mm slices, where the pitch is adjusted based upon the patient's height in a known manner. A routine imaging protocol of 120 kVp and 200–280 ma can be utilized for this operation. The data can be acquired and reconstructed as 1 mm thick slice images having an array size of 512×512 pixels in the field of view, which varies from 34 to 40 cm depending on the patient's size. The number of such slices generally varies under these conditions from 300 to 450, depending on the patient's height. The image data set is converted to volume elements or voxels (step 1530).

Image segmentation can be performed in a number of ways. In one present method of image segmentation, a local neighbor technique is used to classify voxels of the image data in accordance with similar intensity values. In this method, each voxel of an acquired image is evaluated with respect to a group of neighbor voxels. The voxel of interest is referred to as the central voxel and has an associated intensity value. A classification indicator for each voxel is established by comparing the value of the central voxci to each of its neighbors. If the neighbor has the same value as the central voxel, the value of the classification indicator is incremented. However, if the neighbor has a different value from the central voxel, the classification indicator for the central voxel is decremented. The central voxel is then classified to that category which has the maximum indicator value, which indicates the most uniform neighborhood among the local neighbors. Each classification is indicative of a particular intensity range, which in turn is representative of one or more material types being imaged. The method can be further enhanced by employing a mixture probability function to the similarity classifications derived.

Figure 16:
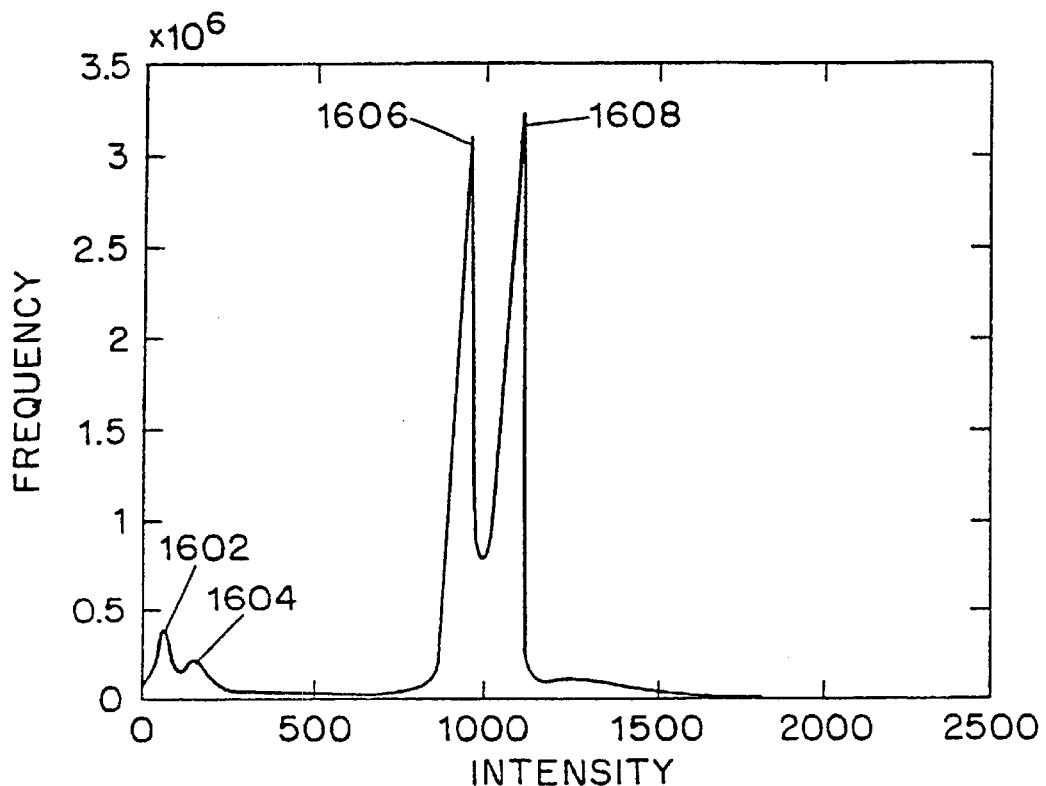
FIG. 16 is a graph of voxel intensity versus frequency of a typical abdominal CT data set.

An alternate process of image segmentation is performed as two major operations: low level processing and high level feature extraction. During low level processing regions outside the body contour are eliminated from further processing and voxels within the body contour are roughly categorized in accordance with well defined classes of intensity characteristics. For example, a CT scan of the abdominal region generates a data set which tends to exhibit a well defined intensity distribution. The graph of FIG. 16 illustrates such an intensity distribution as an exemplary histogram having four, well defined peaks, 1602, 1604, 1606, 1608, which can be classified according to intensity thresholds.

The voxels of the abdominal CT data set are roughly classified as four clusters by intensity thresholds (step 1540). For example, Cluster 1 can include voxels whose intensities are below 140. This cluster generally corresponds to the lowest density regions within the interior of the gas filled colon. Cluster 2 can include voxels which have intensity values in excess of 2200. These intensity values correspond to the enhanced stool and fluid within the colon as well as bone. Cluster 3 can include voxels with intensities in the range of about 900 to about 1080. This intensity range generally represents soft tissues, such as fat and muscle, which are unlikely to be associated with the colon. The remaining, voxels can then be grouped together as cluster 4, which are likely to be associated with the colon wall (including mucosa and partial volume mixtures around the colon wall) as well as lung tissue and soft bones.

Clusters 1 and 3 are not particularly valuable in identifying the colon wall and, therefore are not subject to substantial processing during image segmentation procedures for virtual colonoscopy. The voxels associated with cluster 2 are important for segregating stool and fluid from the colon wall and are processed further during the high-level feature extraction operations. Low level processing is concentrated on the fourth cluster, which has the highest likelihood of corresponding to colon tissue (step 1550).

Figure 17:
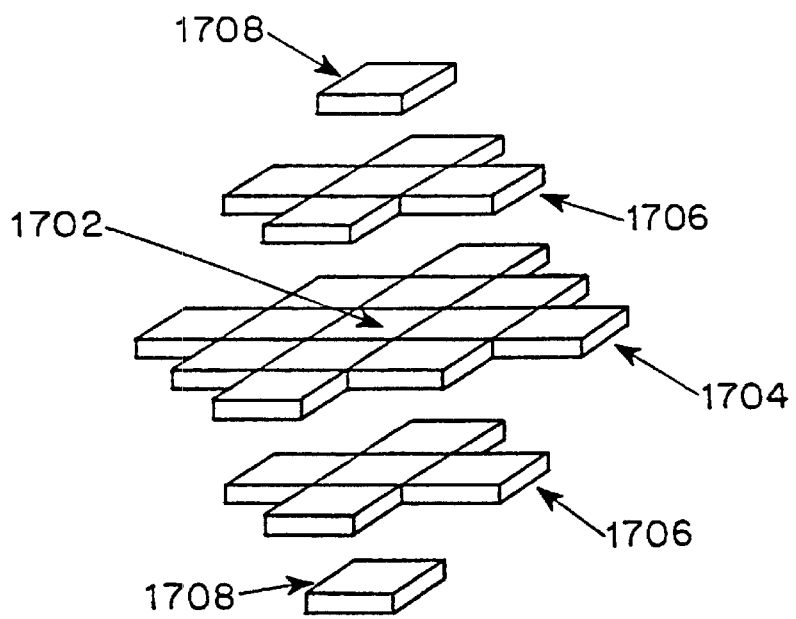
FIG. 17 is a perspective view diagram of an intensity vector structure including a voxel of interest and its selected neighbors.

For each voxel in the fourth cluster, an intensity vector is generated using itself and its neighbors. The intensity vector provides an indication of the change in intensity in the neighborhood proximate a given voxel. The number of neighbor voxels which are used to establish the intensity vector is not critical, but involves a tradeoff between processing overhead and accuracy. For example, a simple voxel intensity vector can be established with seven (7) voxels, which includes the voxel of interest, its front and back neighbors, its left and right neighbors and its top and bottom neighbors, all surrounding the voxel of interest on three mutually perpendicular axes. FIG. 17 is a perspective view illustrating an exemplary intensity vector in the foni of a 25 voxel intensity vector model, which includes the selected voxel 1702 as well as its first, second and third order neighbors. The selected voxel 1702 is the central point of this model and is referred to as the fixed voxel. A planar slice of voxels, which includes 12 neighbors on the same plane as the fixed voxel, is referred to as the fixed slice 1704. On adjacent planes to the fixed slice are two nearest slices 1706, having five voxels each. Adjacent to the first nearest slices 1706 are two second nearest slices 1708, each having a single voxel. The collection of intensity vectors for each voxel in the fourth cluster is referred to as a local vector series.

Because the data set for an abdominal image generally includes more than 300 slice images, each with a 512×512 voxel array, and each voxel having an associated 25 voxel local vector, it is desirable to perform feature analysis (step 1570) on the local vector series to reduce the computational burden. One such feature analysis is a principal component analysis (PCA), which can be applied to the local vector series to determine the dimension of a feature vector series and an orthogonal transformation matrix for the voxels of cluster 4.

It has been found that the histogram (FIG. 16) of the CT image intensities tends to be fairly constant from patient to patient for a particular scanner, given equivalent preparation and scanning parameters. Relying on this observation, an orthogonal transformation matrix can be established which is a predetermined matrix determined by using several sets of training data acquired using the same scanner under similar conditions. From this data, a transformation matrix, such as a Karlhunen-Loéve (K-L) transformation, can be generated in a known manner. The transformation matrix is applied to the local vector series to generate feature vector series. Once in the feature-vector space domain, vector quantization techniques can be used to classify the feature vector series.

An analytical, self-adaptive algorithm can be used for the classification of the feature vectors. In defining this algorithm, let $\{X_i \in R^4 : i=1,2,3,\ldots,N\}$ be the series of the feature vectors, where N is the number of feature vectors; K denotes the maximum number of classes; and T is a threshold which is adaptive to the data set. For each class, a representative element is generated by the algorithm. Let $a_k$ be a representative element of class k and $n_k$ be the number of feature vectors in that class.

The algorithm can then be outlined as:
1. Set $n_1=1$; $a_1=X_1$; $\overline{K}=1$;
2. obtain the class number $\overline{K}$ and class parameters $(a_k, n_k)$ for (i=1; i<N; i++)
      for (j=1; j<$\overline{K}$; j++)
         calculate $d_j$=dist($X_i$, $a_j$);
      end for
      index=arc min $d_j$;
      if (($d_{index}$<T)$^j$ or ($\overline{K}$=K))

update class parameters:

$$a_{index} = \frac{1}{n_{index}+1} \times (n_{index} \cdot a_{index} + X_i);$$

$$n_{index} = n_{index} + 1;$$

end if
      else
         generate new class $$a_{\overline{K}+1}=X_i;$$

$$n_{\overline{K}+1}=1;$$

$$\overline{K}=\overline{K}+1;$$

end else
   end for
3. label each feature vector to a class according to the nearest neighbor rule for (i=1; i<N; i++)
      for (j=1; j<$\overline{K}$; j++)
         calculate $d_j$=dist ($X_i$, $a_j$);
      end for
      index=arc min $d_j$;
         label voxel i to class index.
   end for In this algorithm, dist(x,y) is the Euclidean distance between vector x and y and arc min $d_j$ gives the integer j which realizes the minimum value of $d_j$.

The above described algorithm is dependent only on the parameters T and K. However, the value of K, which relates to the number of classes within each voxel cluster, is not critical and can be set to a constant value, such as K=18. However, T, which is the vector similarity threshold, greatly influences the classification results. If the selected value of T is too large, only a single class will be generated. On the other hand, if the value of T is too small, the resulting classes will exhibit undesirable redundancy. By setting the value of T to be equal to the maximum component variance of the feature vector series, the maximum number of distinct classes results.

As a result of the initial classification process, each voxel within the selected Cluster is assigned to a class (step 1570). In the exemplary case of virtual colonoscopy, there are several classes within cluster 4. Thus, the next task is to determine which of the several classes in cluster 4 corresponds to the colon wall. The first coordinate of the feature vector, which is that coordinate of the feature vector exhibiting the highest variance, reflects the information of the averagye of the 3D local voxel intensities. The remaining, coordinates of the feature vector contain the information of directional intensity change within the local neighbors. Because the colon wall voxels for the interior of the colon are generally in close proximity to the gas voxels of cluster 1, a threshold interval can be determined by data samples selected from typical colon wall intensities of a typical CT data set to roughly distinguish colon wall voxel candidates. The particular threshold value is selected for each particular imaging protocol and device. This threshold interval can then applied to all CT data sets (acquired from the same machine, using the same imaging protocol). If the first coordinate of the representative element is located in the threshold interval, the corresponding class is regarded as the colon wall class and all voxels in that class are labeled as colon wall-like voxels.

Each colon wall-like voxel is a candidate to be a colon wall voxel. There arc three possible outcomes of not belonging to the colon wall. The first case relates to voxels which are close to the stool/liquid inside the colon. The second case occurs when voxels are in the lung tissue regions. The third case represents mucosa voxels. Clearly then, low level classification carries a degree of classification uncertainty. The causes of the low-level classification uncertainty vary. For example, a partial-volume effect resulting from voxels containing more than one material type (i.e., fluid and colon wall) leads to the first case of uncertainty. The second and the third cases of uncertainty are due to both the partial volume effect as well as the low contrast of CT images. To resolve the uncertainty, additional information is needed. Thus, a high-level feature extraction procedure is used in the present method to further distinguish candidates for the colon wall from other colon wall-like voxels, based on a priori anatomical knowledge of the CT images (step 1580).

Figure 18A:
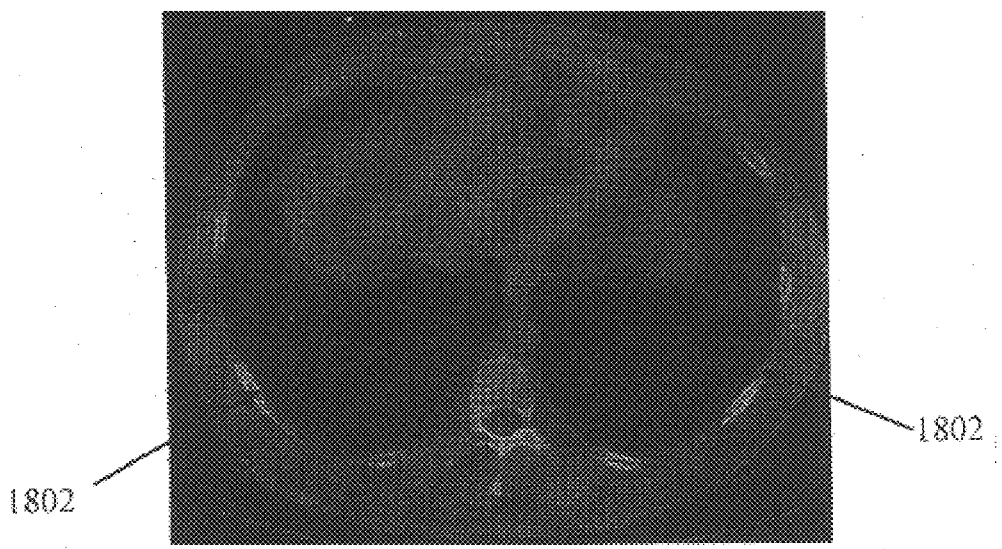
FIG. 18A is an exemplary image slice from a CT scan of a human abdominal regions primarily illustrating a region including the lungs.
Figure 18B:
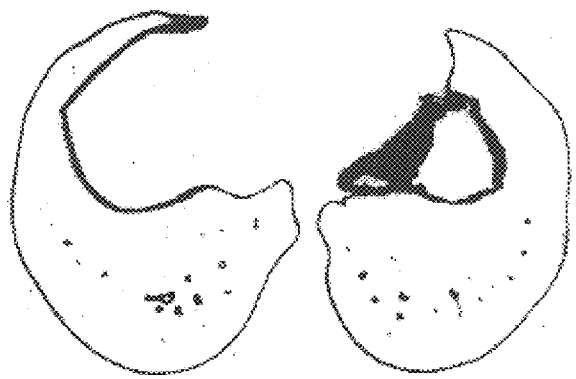
FIG. 18B is a pictorial diagram illustrating the identification of the lung region in the image slice of FIG. 18A.
Figure 18C:
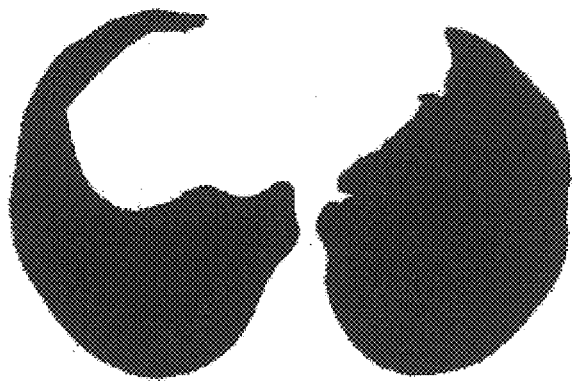
FIG. 18C is a pictorial diagram illustrating the removal of the lung volume identified in FIG. 18B.

An initial step of the high-level feature extraction procedure can be to eliminate the region of lung tissue from the low-level classification results. FIG. 18A is an exemplary slice image clearly illustrating the lung region 1802. The lung region 1802 is identifiable as a generally contiguous three dimensional volume enclosed by colon wall-like voxels, as illustrated in FIG. 18B. Given this characteristic, the lung region can be identified using a region growing strategy. The first step in this technique is to find a seed voxel within the region of growing. Preferably, the operator performing the CT imaging scan sets the imaging range such that the top most slice of the CT scan does not contain any colon voxels. As the interior of lung should be filled with air, the seed is provided by the low-level classification simply by selecting an air voxel. Once the lung region outline of FIG. 18B is determined, the lung volume can be removed from the image slice (FIG. 18C).

Figure 19A:
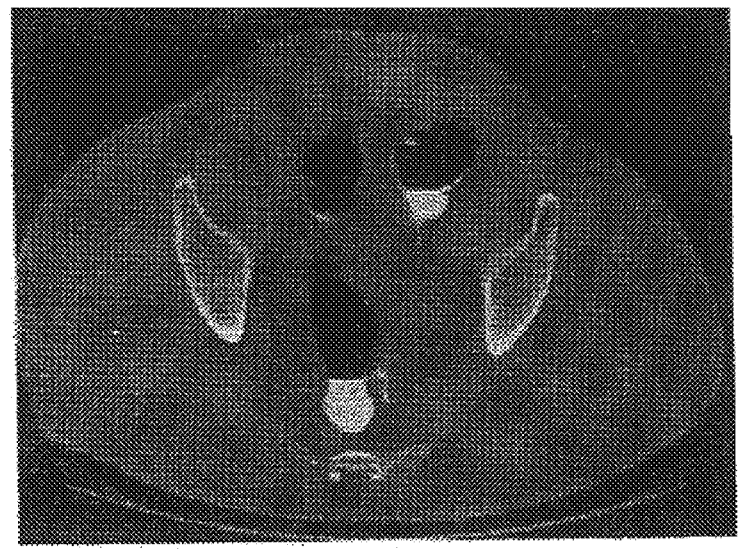
FIG. 19A is a exemplary image slice form a CT scan of a human abdominal region, primarily illustrating a region including a portion of the colon and bone.
Figure 19B:
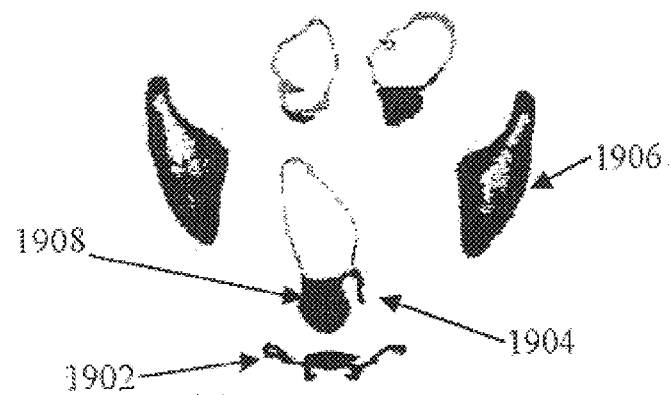
FIG. 19B is a pictorial diagram illustrating the identification of the colon and bone region from the image slice of FIG. 19A.
Figure 19C:
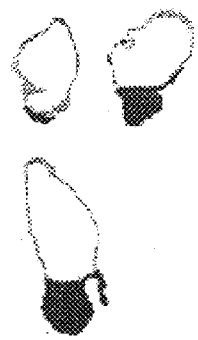
FIG. 19C is a pictorial diagram illustrating the image scan of FIG. 19a with the regions of bone removed.

A next step in performing high-level feature extraction can be to separate the bone voxels from enhanced stool/fluid voxels in cluster 2. The bone tissue voxels 1902 are generally relatively far away from the colon wall and resides outside the colon volume. To the contrary, the residual stool 1906 and fluid 1904 are enclosed inside the colon volume. Combining the a priori proximity information and the colon wall information obtained from the low-level classification process, a rough colon wall volume is generated. Any voxel separated by more than a predetermined number (e.g., 3) of voxel units from the colon wall, and outside the colon volume, will be labeled as bone and then removed from the image. The remaining voxels in cluster 2 can be assumed to represent stool and fluid within the colon volume (see FIGS. 19A–C).

The voxels within the colon volume identified as stool 1906 and fluid 1904 can be removed from the image to generate a clean colon lumen and colon wall image. In general, there are two kinds of stool/fluid reions. One region type is small residual areas of stool 1906 attached to the colon wall. The other region type is large volumes of fluid 1904, which collect in basin-like colonic folds (see FIGS. 19A–C).

The attached residual stool regions 1906 can be identified and removed because they are inside the rough colon volume generated during the low-level classification process. The fluid 1906 in the basin-like colon fold usually has a horizontal surface 1908 due to the effect of gravity. Above the surface is always a gas region, which exhibits a very high contrast to the fluid intensity. Thus, the surface interface of the fluid regions can be easily marked.

Using a region growing strategy, the contour of the attached stool regions 1906 can be outlined, and the part which is away from the colon wall volume can be removed. Similarly, the contour of the fluid regions 1904 can also be outlined. After eliminating the horizontal surfaces 1908, the colon wall contour is revealed and the clean colon wall is obtained.

It is difficult to distinguish the mucosa voxels from the colon wall voxels. Even though the above three dimensional processing can remove some mucosa voxels, it is difficult to remove all mucosa voxels. In optical colonoscopy, physicians directly inspect the colonic mucosa and search for lesions based on the color and texture of the mucosa. In virtual colonoscopy, most mucosa voxels on the colon wall can be left intact in order to preserve more information. This can be very useful for three dimensional volume rendering.

From the segmented colon wall volume, the inner surface, the outer surface and the wall itself of the colon can be extracted and viewed as a virtual object. This provides a distinct advantage over conventional optical colonoscopy in that the exterior wall of the colon can be examined as well as the interior wall. Furthermore, the colon wall and the colon lumen can be obtained separately from the segmentation.

Because the colon is substantially evacuated prior to imaging, a commonly encountered problem is that the colon lumen collapses in spots. While the inflation of the colon with compressed gas, such as air or $CO_2$, reduces the frequency of collapsed regions, such areas still occur. In perfoiming a virtual colonoscopy, it is desirable to automatically maintain a flight path through the collapsed regions and it is also desirable to use the scanned image data to at least partially recreate the colon lumen in the collapsed regions. Since the above described image segmentation methods effectively derive both the interior and exterior of the colon wall, this infonation can be used to enhance the generation of the fly path through the collapsed regions.

In extending the flight path through collapsed regions of the colon or expanding a collapsed region of the colon, the first step is to detect a collapsed region. Using the premise that the grayscale values of the image data from around the outside of the colon wall change much more dramatically than the greyscale values within the colon wall itself, as well as in other regions such as fat, muscle and other kinds of tissue, an entropy analysis can be used to detect areas of colon collapse.

The degree of change in greyscale value, for example along the centerline, can be expressed and measured by an entropy value. To calculate an entropy value, voxels on the outer surface of the colon wall are selected. Such points are identified from the above described image segmentation techniques. A 5×5×5 cubic window can be applied to the pixels, centered on the pixel of interest. Prior to calculating the entropy value, a smaller (3×3×3) window can be applied to the pixels of interest in order to filter out noise from the image data. The entropy value of a selected window about the pixel can then be determined by the equation:

$$E = \sum_i C(i)\ln(C(i))$$

where E is the entropy and C(i) is the number of points in the window with the grayscale of i (i=0,1,2, . . . , 255). The calculated entropy values for each window are then compared against a predetermined threshold value. For regions of air, the entropy values will be fairly low, when compared to regions of tissue. Therefore, along the centerline of the colon lumen, when the entropy values increase and exceed the predetermined threshold value, a collapsed region is indicated. The exact value of the threshold is not critical and will depend in part on the imaging protocol and particulars of the imaging device.

Once a collapsed region is detected, the previously determined centerline flight path can be extended through the region by piercing through the center of the collapse with a one voxel wide navigation line.

In addition to automatically continuing the flight path of the virtual camera through the colon lumen, the region of colon collapse can be virtually opened using a physical modeling technique to recover some of the properties of the collapsed region. In this technique, a model of the physical properties of the colon wall is developed. From this model, parameters of motion, mass density, damping density, stretching and bending coefficients are estimated for a Lagrange equation. Then, an expanding force model (i.e., gas or fluid, such as air, pumped into the colon) is formulated and applied in accordance with the elastic properties of the colon, as defined by the Lagrange equation, such that the collapsed region of the colon image is restored to its natural shape.

To model the colon, a finite-element model can be applied to the collapsed or obstructed regions of the colon lumen. This can be performed by sampling the elements in a regular grid, such as an 8 voxel brick, and then applying traditional volume rendering techniques. Alternatively, an irregular volume representation approach, such as tetrahedrons can be applied to the collapsed regions.

In applying the external force (air pumping) model to the colon model, the magnitude of the external force is first determined to properly separate the collapsed colon wall regions. A three dimensional growing model can be used to trace the internal and external colon wall surfaces in a parallel manner. The respective surfaces are marked fiom a starting point at the collapsed region to a growing source point, and the force model is applied to expand the surfaces in a like and natural mannier. The region between the internal and external surfaces, i.e., the colon wall, are classified as sharing regions. The external repulsive force model is applied to these sharing regions to separate and expand the collapsed colon wall segments in a natural manner.

To more clearly visualize the features of a virtual object, such as the colon, which is subjected to virtual examination, it is advantageous to provide a rendering of the various textures of the object. Such textures, which can be observed in the color images presented during optical colonoscopy, are often lost in the black and white, grey scale images provided by the CT image data. Thus a system and method for texture imaging during virtual examination is required.

Figure 20:
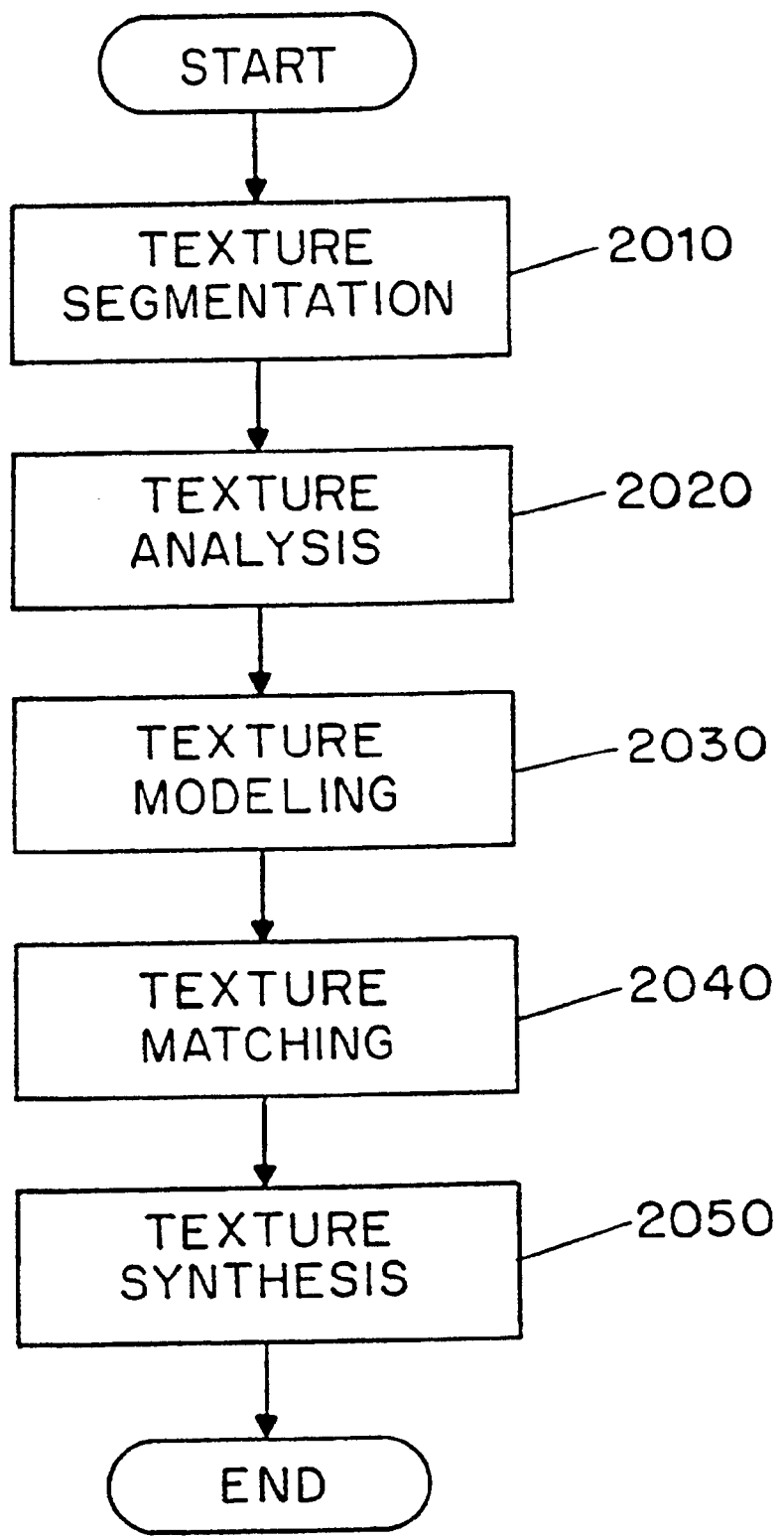
FIG. 20 is a flowchart illustrating a method for applying texture to monochrome image data.

FIG. 20 is a flow chart depicting a present method for generating virtual objects having a texture component. The purpose of this method is to map textures obtained by optical colonoscopy images in the red-green-blue (RGB) color space, as for example from the Visible Human, onto the gray scale monochrome CT image data used to generate virtual objects. The optical colonoscopy images are acquired by conventional digital image acquisition techniques, such as by a digital "frame grabber" 1429 which receives analog optical images from a camera, such as a video camera, and converts the image to digital data which can be provided to CPU 1423 via interface port 1431 (FIG. 14). The first step in this process is to segment the CT image data (step 2010). The above described image segmentation techniques can be applied to choose intensity thresholds in the grey scale image to classify the CT image data into various tissue types, such as bone, colon wall tissue, air, and the like.

In addition to performing image segmentation on the CT image data, the texture features of the optical image need to be extracted from the optical image data (step 2020). To do this, a gausiani filter can be applied to the optical image data followed by sub-sampling to decompose the data into a multiresolutional pyramid. A laplacian filter and steerable filter can also be applied to the multiresolutionial pyramid to obtain oriented and non-oriented features of the data. While this method is effective at extracting and capturing the texture features, the implementation of this approach requires a large amount of memory and processing power.

An alternative approach to extracting the texture features from the optical image is to utilize a wavelet transform. However, while wavelet transformations are generally computationally efficient, conventional wavelet transforms are limited in that they only capture features with orientations parallel to the axes and cannot be applied directly to a region of interest. To overcome these limitations, a non-separable filter can be employed. For example, a lifting scheme can be employed to build filter banks for wavelets transform in any dimension using a two step, prediction and updating approach. Such filter banks can be synthesized by the Boor-Rom algorithm for multidimensional polynomial interpolation.

After the textural features are extracted from the optical image data, models must be generated to describe these features (step 2030). This can be performed, for example, by using a non-parametric multi-scale statistical model which is based on estimating and manipulating the entropy of non-Gaussian distributions attributable to the natural textures.

Once texture models are generated from the optical image data, texture matching must be performcd to correlate these models to the segmented CT image data (step 2050). In regions of the CT image data where the texture is continuous, corresponding classes of texture are easily matched. However, in boundary regions between two or more texture regions, the process is more complex. Segmentation of the CT data around a boundary region often leads to data which is fuzzy, i.e., the results reflect a percentage of texture from each material or tissue and vary depending on the various weighting of each. The weighting percentage can be used to set the importance of matching criteria.

In the case of the non-parametric multi-scale statistical model, the cross entropy or a Kullback-Leiber divergence algorithm can be used to measure the distribution of different textures in a boundary region.

After texture matching, texture synthesis is performed on the CT image data (step 2050). This is done by fusing the textures from the optical image data in to the CT image data. For isotropic texture patterns, such as presented by bone, the texture can be sampled directly from the optical data to the segmented CT image data. For anisotropic texture regions, such as colon mucosa, a multiresolution sampling procedure is preferred. In this process, selective re-sampling for homogenous and heterogenous relions is employed.

Volume Rendering

Figure 21:
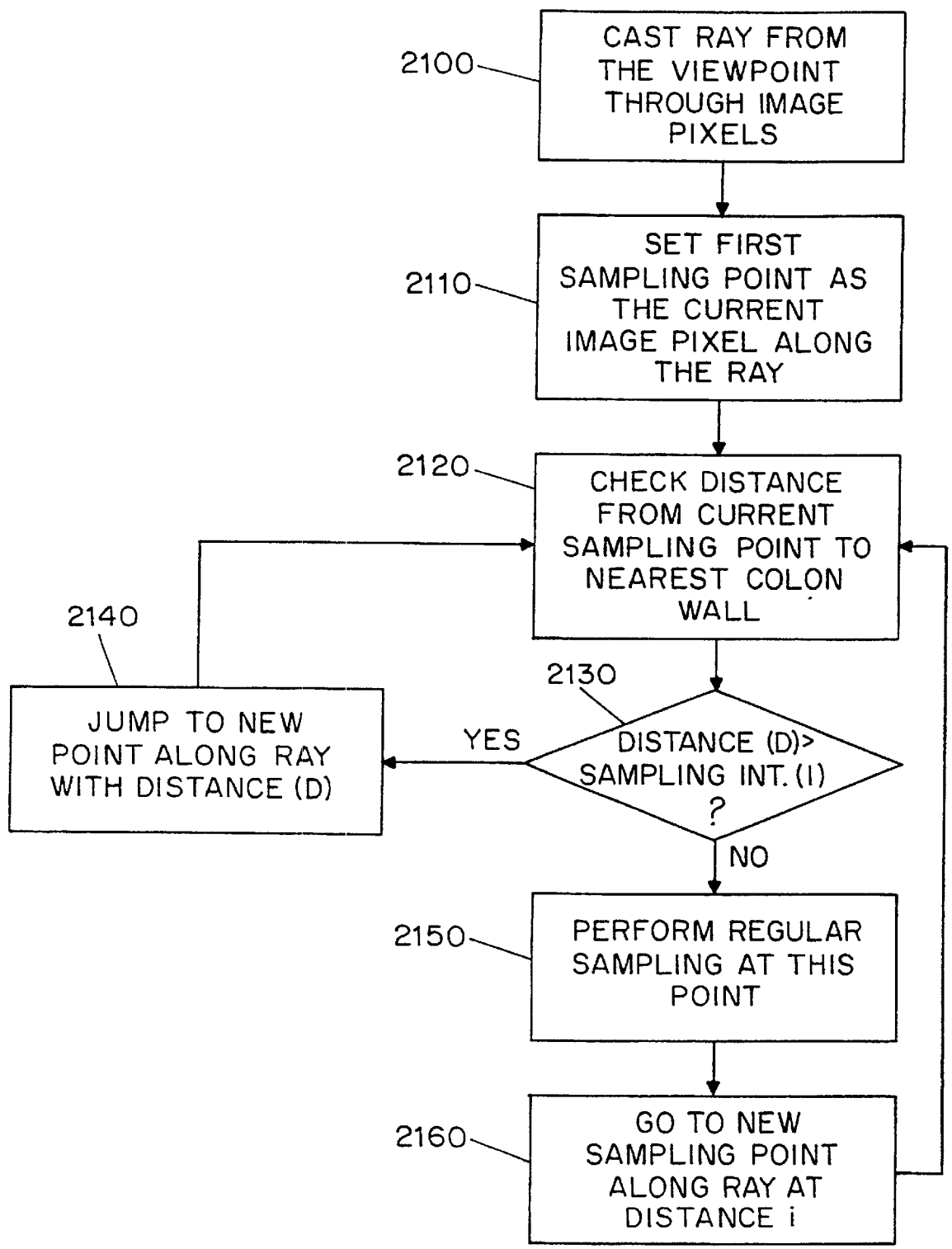
FIG. 21 is a flowchart illustrating a method for volume rendering employing a ftst perspective ray casting technique.
Figure 22:
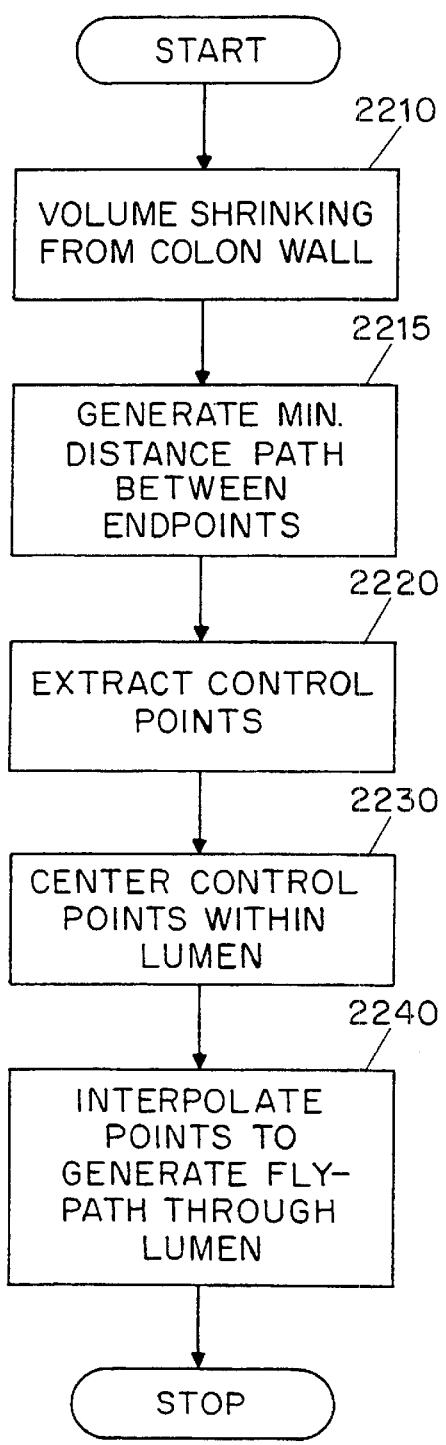
FIG. 22 is a flowchart illustrating a method for determining the central flight path through a colon lumen employing a volume shrinking technique.

In addition to image segmentation and texture mapping described above, volume rendering techniques can be used in connection with virtual colonoscopy procedures to further enhance the fidelity of the resulting image. FIG. 21 illustrates a perspective volume ray-casting method which can be used for volume rendering in accordance with the present invention. From a selected virtual viewpoint, e.g., camera position, such as within the colon lumen, rays are cast through each of the proximate image pixels (step 2100). For each ray, the first sampling point is set as the current image pixel along the ray (step 2110). The distance (d) between the current sampling point and the nearest colon wall is then determined (step 2120). The current distance (d) is compared to a predetermined sampling interval (i) (step 2130). If the distance (d) is lreater than the sampling interval (i) then no sampling occurs and the next sampling point along the ray is determined by jumping the distance d along the ray (step 2140). If the distance is less than or equal to the sampling interval (i) then conventional sampling is performed on this point (step 2150) and the next sampling point is selected in accordance with the sampling interval (i) (step 2160). For example, trilinear interpolation between the density values of 8 neighlborinig voxels can be performed to determine the new density value at the sampling point.

The method of FIG. 21 effectively accelerates ray-casting because a space leaping technique is used to quickly skip over empty space along the ray of the image plane to the colon wall. In this method, a distance from a sample point to the nearest colon wall is determined along each ray. If the distance is larger than a predetermined sampling interval (i), a jump to the next sampling point along the ray is performed. Since the closest distance infonnation is already available from the potential field which is used for virtual camera control, no additional distance coding calculations are required. In this case, neither surface rendering nor Z-buffer transform is required, which results in savings in preprocessing time and memory space.

Alternatively, a space leaping method can derive distance information for each ray from the Z-buffer of the corresponding surface rendering image. If the surface rendering image and volume rendering, image will both be generated, this approach provides minimal processing overhead burden as the Z-buffer information is provided as a result of the surface rendering methods. Thus, this form of space leaping method only requires additional processing to perform a depth transformation from the image space domain to the world space domain.

For those regions along the ray where the distance (d) was traversed in step 2140, the region along the ray corresponds to open space and can be assigned a value according to an open space transfer function. Typically, open space will have no contributioni on the final pixel value. For each point where sampling takes place, one or more defined transfer functions can be assigned to map different ranges of sample values of the original volume data to different colors and opacities and possibly other displayable parameters. For example, four independent transfer functions have been used to determine different material by mapping ranges of CT density values into specified colors of red, green, blue and opacity, each in the range of 0 to 255.

Virtual Biopsy

The above described techniques can also form the basis of a system for performing virtual electronic biopsy of a region being examined to effect a flexible and non-invasive biopsy.

As noted above, volume rendering techniques use one or more defined transfer functions to map different ranges of sample values of the original volume data to different colors, opacities and other displayable parameters for navigation and viewing. During navigation, the selected transfer function generally assigns maximum opacity to the colon wall such that the outer surface is easily viewed. Once a suspicious area is detected during virtual examination, the physician can interactively change the transfer function assigned during the volume rendering procedure such that the outer surface being viewed becomes substantially transparent, allowing the region information to be composited and thus the interior structure of the region to be viewed. Using a number of predetermined transfer functions, the suspicious area can be viewed at a number of different depths, with varying degrees of opacity assigned throughout the process.

Polyp Detection

The present system and methods can be used to perform automated polyp detection. With reference to FIG. 13, polyps 1305, which occur, for example, within the colon, generally take the form of small convex hill-like structures extending from the colon wall 1301. This geometry is distinct from the fold of the colon wall. Thus, a differential geometry model can be used to detect such polyps on the colon wall.

The surface of the colon lumen can be represented as a continuously second differentiable surface in three dimensional Euclidean space, such as by using a C-2 smoothness surface model. Such a model is described in "Modern Geometry Methods and Applications" by B. A. Dubrovin et al, published by Springer-Verlag 1994, which is hereby incorporated by reference in its entirety. In this model, each voxel on the surface of the colon has an associated geometrical feature which has a Gauss curvature, referred to as Gauss curvature fields. A convex hill on the surface, which may be indicative of a polyp, possesses a unique local feature in the Gauss curvature fields. Accordingly, by searching the Gauss curvature fields for specific local features, polyps can be detected. Once detected, the suspected polyps can be highlighted and thus brought to the attention of the physician where the physician can measure the suspected polyp and use the above described virtual biopsy methods to further investigate the suspicious region.

Central Fly-Path Generation

In the case of virtual colonoscopy, determining a proper navigation line, or fly-path, through the colon lumen is an important aspect of the described systems and methods. While certain techniques for determining the fly-path of the virtual camera model were discussed with respect to FIGS. 4–8, FIG. 22 illustrates an alternate method of generating the central fly-path through the colon lumen. After the colon wall is identified, such as by the image segmentation methods described herein, a volume shrinking algorithm can be employed to emphasize the trend of the colon lumen and reduce subsequent searching time within the lumen volume (step 2310).

Figure 23:
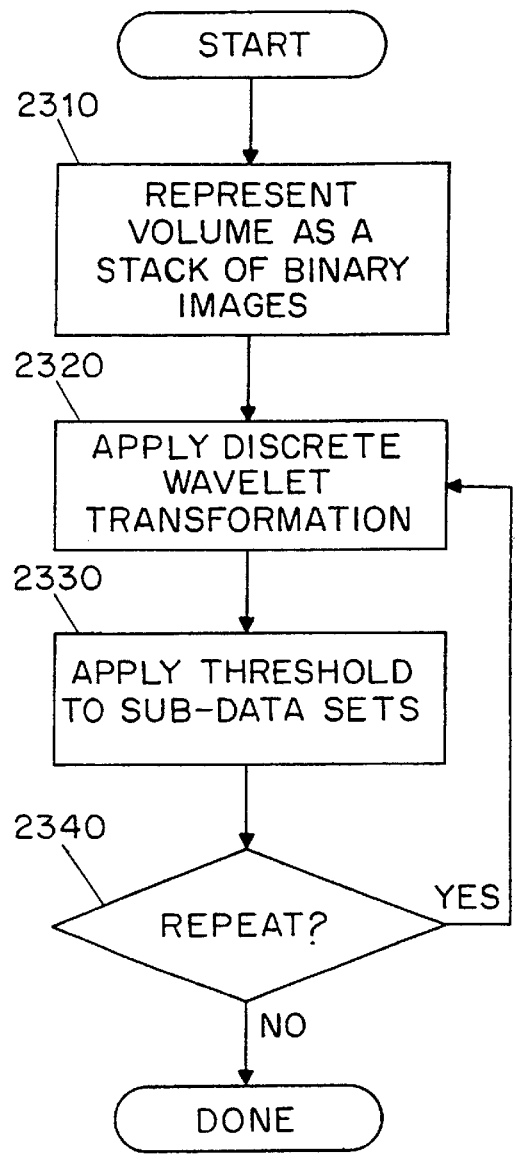
FIG. 23 is a flowchart further illustrating a volume shrinking technique for use in the method illustrated in FIG. 22.

FIG. 23 further illustrates the steps of an exemplary volume shrinking algorithm, which is based on a multiresolution analysis model. In this procedure, the three dimensional volume is represented by a stack of binary images which have the same matrix size (step 2310). Collectively, these images form a binary data set. A discrete wavelet transformation can be applied to the binary data set which results in a number of sub-data sets representing different time-frequency components of the binary data set (step 2320). For example, the discrete wavelet transformation may yield eight (8) sub-data sets. The sub-data sets are compared against predetermined threshold values such that the lowest frequency component is identified (step 2330). This component forms the binary data set for subsequent discrete wavelet transformation and thresholding steps, which are recursively applied in a multi-resolution structure (step 2340). In the case of virtual colonoscopy, the discrete wavelet transformation and associated thresholding can be applied three times recursively on the subsequent sub-dataset that represents the lowest frequency component (a 3-level multi-resolution decomposition).

Returning to FIG. 22, from the reduced colon volume model, a distance map technique can be employed to generate a minimum distance path between the two ends of the colon, e.g., fiom the rectum to the cecum (step 2215). The resulting path preserves the global trend information of the colon lumen, but ignores the trends exhibited by local folds. Control points within the global colon can then be determined by mapping the minimum distance path back to the original data space (Step 2220). For example, in the case of a 3-level multi-resolution decomposition, the reduced volume is three times smaller than the original volume and an affine transformation, which is well known, can be used to map the reduced volume model exactly back to the original scale volume. The minimum distance path of the reduced value can also be mapped back into the original scale volume as a series of points, which can be used as the control points within the colon.

The preferred fly path is one which is on the centerline of the colon lumen. However, the initial control points may not be exactly located in the center of the colon lumen. Thus, the initial control points can be centered, such as by the use of a bi-section plane algorithm (step 2230). For example, at each selected control point, a bi-section plane can be defined as a plane normal to the trend direction and cutting across the colon lumen. A centralization algorithm, such as a maximum disk algorithm, can then be performed on each bi-section plane. Such an algorithm is discussed in the article "On the Generation of Skeletons from Discrete Euclidean Distance Maps" by Ge et al., IEEE Transactions on PAMI, Vol. 18, pp. 1055–1066, 1996 which is hereby incorporated by reference.

Once the control points are centralized, the flight path can be determined by interpolating a line connecting these points (step 2240). In the case of virtual colonoscopy, it is desirable that the interpolated flight path take the form of a smooth curve which is substantially centered within the colon lumen. A constrained cubic B-spline interpolation algorithm based on Serret-Frenet Theorem in differential geometry theory can be used to establish a suitable smooth curved flight path, such as is described in "Numerical Recipes in C: The Art of Scientific Computing," by Press et al., Second Edition, Cambridge University Press, 1992.

Figure 24:
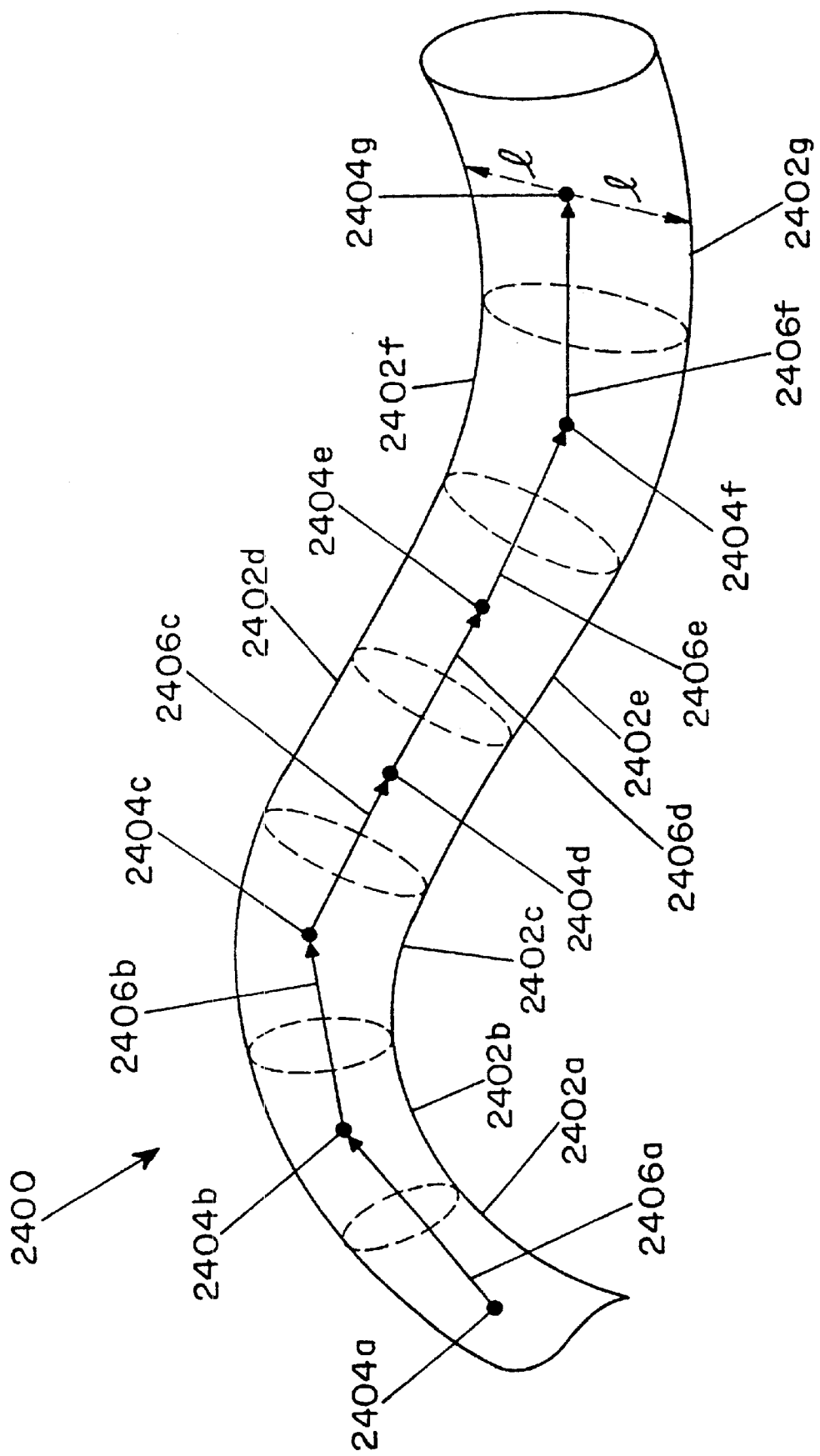
FIG. 24 is a three dimensional pictorial representation of a segmented colon lumen with a central fly-path generated therein.
Figure 25:
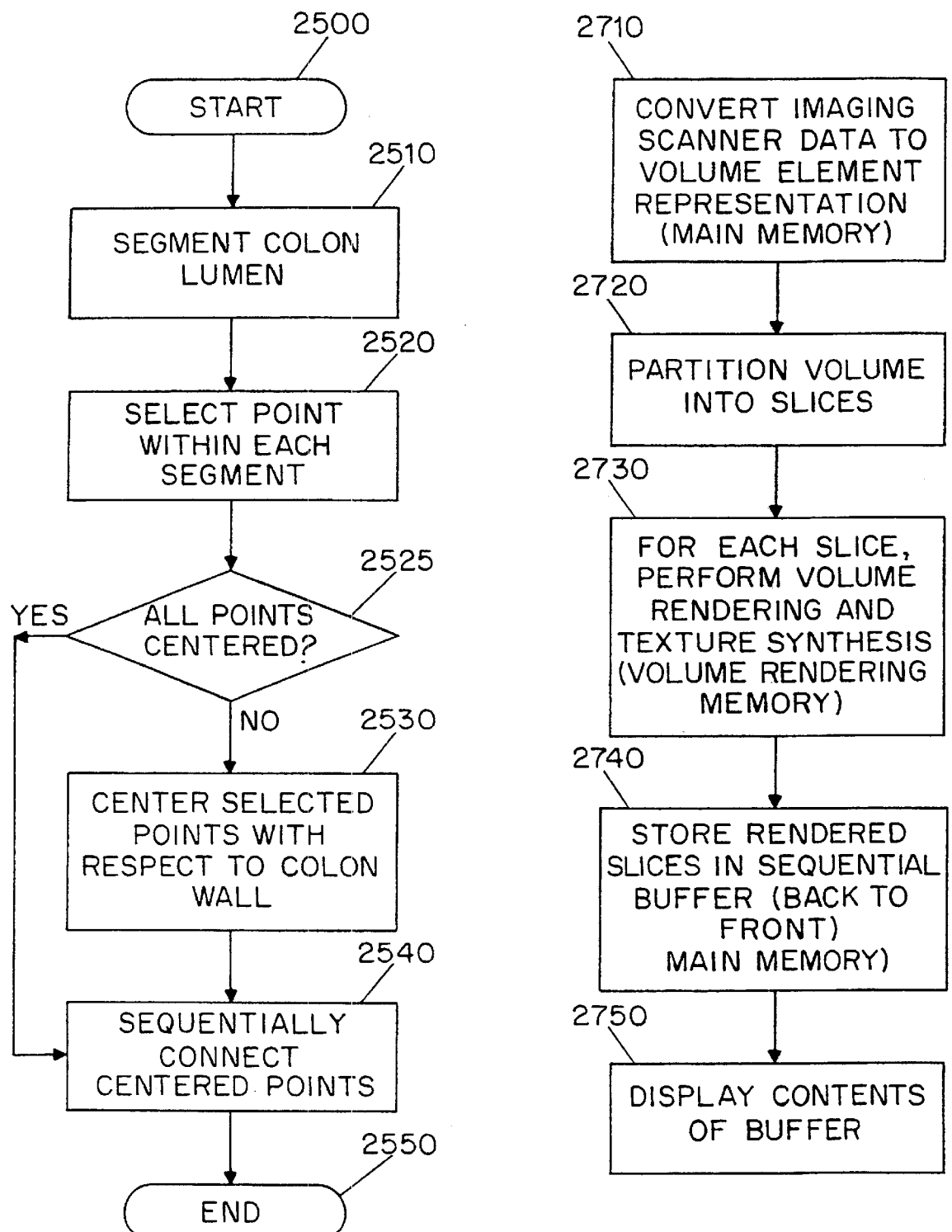
FIG. 25 is a flow chart illustrating a method of generating a central flight path through a colon lumen employing a segmentation technique.

The pictorial representation of a segmented colon lumen in FIG. 24 and the flow chart of FIG. 25 set forth yet another alternate fly-path generation method in accordance with the present invention. In this alternate method, the representation of the colon lumen 2400 is first partitioned into a number of segments 2402 a–g along the length of the lumen 2400 (step 2500). From within each segment 2402 a representative point is selected 2404 a–g (step 2520). Each representative point 2404 a–g is then centered with respect to the colon wall (step 2530), such as by the use of a physically-based defoimable model which is used to push the points to the center of the respective segment. After the representative points are centered, the points are sequentially joined to establish the center-line fly-path for the virtual camera model (step 2540). If the segments are sufficiently small in length, the centered points can be connected with straight line segments 2406 a–f. However, when linear curve fitting techniques are applied to join the centered points, a smoother, continuous flight path is established.

Each of the foregoing methods can be implemented using a system as illustrated in FIG. 14, with appropriate software being provided to control the operation of CPU 1409 and CPU 1423.

Figure 26:
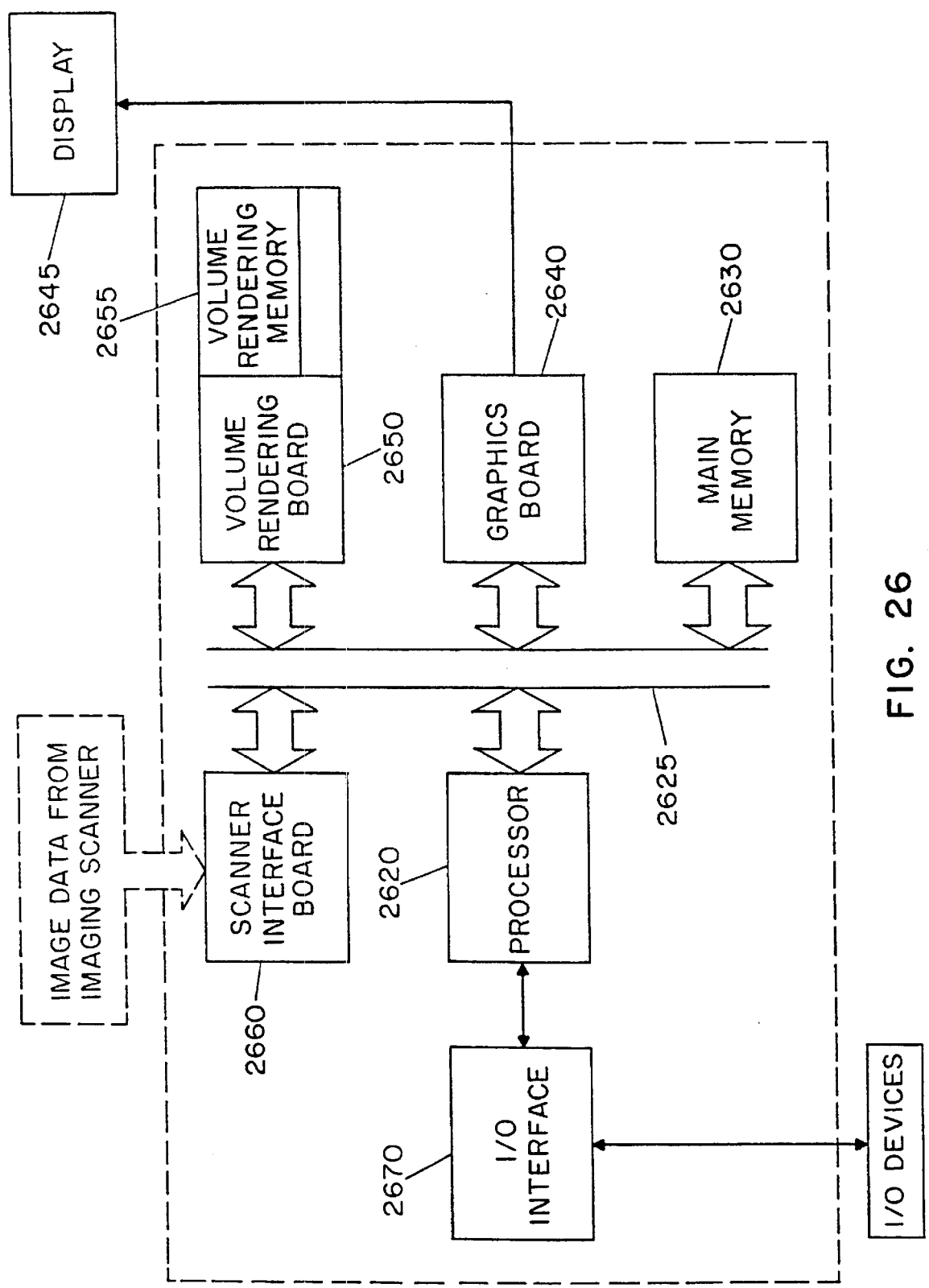
FIG. 26 is a block diagram of a system embodiment based on a personal computer bus architecture.

An alternate hardware embodiment, suitable for deployment on a personal computer, is illustrated in FIG. 26. The system includes a processor 2600 which should take the form of a high speed, multitasking processor such as a Pentium III processor operating at a clock speed in excess of 400 MHZ. The processor 2600 is coupled to a conventional bus structure 2620 which provides for high speed parallel data transfer. Also coupled to the bus structure 2620 are main memory 2630, a graphics board 2640, and a volume rendering board 2650. The graphics board 2640 is preferably one which can perfonn texture mapping,, such as the Diamond Viper v770 Ultra manufactured by Diamond Multimedia Systems. The volume rendering board 2650 can take the foni of the VolumePro board from Mitsubishi Electric, which is based on U.S. Pat. Nos. 5,760,781 and 5,847,711, which are hereby incorporated by reference. A display device 2645, Such as a conventional SVGA or RGB monitor, is operatively coupled to the graphics board 2640 for displaying the image data. A scanner interface board 2660 is also provided for receiving data from an imaging scanner, such as an MRI or CT scanner, and transmitting such data to the bus structure 2620. The scanner interface board 2660 may be an application specific interface product for a selected imaging scanner or can take the form of a general purpose input/output card. The PC based system 2600 will generally include an I/O interface 2670 for coupling I/O devices 2680, such as a keyboard, digital pointer (e.g., mouse) and the like to the processor 2620. Alternatively, the I/O interface can be coupled to the processor 2620 via the bus 2620.

In the case of three dimensional imaging, including texture synthesis and volume rendering, numerous data handling and processing operations are required. For large datasets, such as those represented by the colon lumen and its surrounding area, such processing can be very time consuming and memory intense. However, using the topology of FIG. 26 in accordance with the processing method illustrated in the flow chalrt of FIG. 27, such operations can be perfonred on a relatively low cost personal computer (PC). Imaging data is received by the processor 2620 and stored in main memory 2630 via the scanner interface board 2660 and bus structure 2620. This image data (pixels) is converted into a volume element (voxel) representation (step 2710). The volume representation, which is stored in main memory 2630, is partitioned, for example into slices, such as along a major volume axis or other portions of the region being imaged (step 2720). The volume partitions are then transferred to the volume rendering board and temporarily stored in volume rendering memory 2655 for volume rendering operations (step 2730). The use of locally resident volume rendering memory 2655 provides for enhanced speed in volume rendering as data need not be exchanged over the bus 2620 during rendering of each slice of the total volume. Once volume rendering is complete for the slice, the rendered data is transferred back to main memory 2630 or the graphics board 2640 in a sequential buffer (step 2740). After all slices of interest have been subjected to rendering, the contents of the sequential buffer are processed by the graphics board 2640 for display on the display unit 2645 (step 2750).

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

For example, the methods and systems described herein could be applied to virtually examine an animal, fish or inanimate object. Besides the stated uses in the medical field, applications of the technique could be used to detect the contents of sealed objects which cannot be opened. The technique could also be used inside an architectural structure such as a building or cavern and enable the operator to navigate through the structure.

What is claimed is:

1. A method for generating a fly-path through a virtual colon lumen, defined in part by a colon wall, for virtual colonoscopy, comprising:
   applying volume shrinking from the wall of the virtual colon lumen to generate a compressed colon lumen data set;
   generating a minimum distance path between endpoints of the virtual colon lumen from the compressed colon lumen data set;
   extracting control points along minimum distance path along the length of the virtual colon lumen;
   centering the control points within the virtual colon lumen; and
   interpolating a line between the centered control points.

2. The method for generating a fly-path of claim 1, wherein the step of volume shrinking includes the steps:
   representing the colon lumen as a plural stack of image data;
   applying a discrete wavelet transformation to the image data to generate a plurality of sub-data sets with components at a plurality of frequencies;
   selecting the lowest frequency components of the sub-data sets.

3. A method for generating a fly-path through a virtual colon lumen during virtual colonoscopy, comprising:
   partitioning the virtual colon lumen into a plurality of segments along the length of the virtual colon lumen;
   selecting a point within each segment;
   centering each point with respect to a wall of the virtual colon lumen; and
   connecting the centered points to establish the fly path.

4. A method for perfonuing examination of a virtual colon lumen, the method comprising:
   selecting a view point within the colon lumen;
   casting rays from the view point through each image pixel;
   determining a distance from the view point to a wall of the colon along each ray;
   if the distance exceeds a sampling interval, jumping along the ray by the distance and assigining an open space transfer function to the points along the ray over the distance,
   if the distance does not exceed the sampling interval, then sampling the pixel and determininig a value based on a transfer function.

5. A method of performing virtual biopsy of a region in a virtual colon comprising:
   assigning an initial transfer function to the region for navigating the colon;
   performing volume rendering using said initial transfer function;
   viewing the region;
   dynamically altering the transfer function to selectively alter the opacity of the region being viewed; and
   performing volume irendering using said altered transfer function.

6. A method of detecting polyps on the walls of a virtual colon, represented by a plurality of volume units, comprising:
   representing the surface of the colon walls as a second differentiable surface where each surface volume unit has an associated Gauss curvature;
   searching the Gauss curvatures for local features; and
   classifying local features correspondilng to convex hill-like protrusions from the surface of the colon wall as polyps.

7. The method of claim 6 including the step of performing virtual biopsy on areas of the colon classified as polyps.

8. The method of claim 7 wherein the step of performing virtual biopsy comprises:
   assigning an initial transfer function to the region for navigating the colon;
   performing volume rendering using said initial transfer function;
   viewing the region;
   dynamically altering the transfer function to selectively alter the opacity of the region being viewed; and
   performing volume rendering using said altered transfer function.

9. A method of perfor-minig virtual colonoscopy comprising:
   acquiring an image data set of a region including the colon;
   converting the image data to volume units;
   represeniting the colon lumen as a plurality of volume units;
   identifying those volume units representing a wall of the colon lumen;
   establishing a fly-path for navigating through said colon lumen;
   applying at least one transfer function to map color and opacities to the wall of the colon lumen;
   displaying the colon lumen along the fly path in accordance with the assigned transfer functions.

10. The method of performing virtual colonoscopy according to claim 9, wherein said step of generating a fly-path comprises:
    applying volume shrinking from the wall of the virtual colon lumen;
    generating a minimum distance path between endpoints of the virtual colon lumen;
    extracting control points along a length of the virtual colon lumen;
    centering the control points within the virtual colon lumen;
    interpolating a line connecting the centered control points.

11. The method of claim 10, wherein the step of volume shrinking includes the steps:
    representing the colon lumen as a plural stack of image data;
    applying a discrete wavelet transformation to the image data to generate a plurality of sub-data sets;

selecting the lowest frequency components of the sub-data sets.

12. The method of performing virtual colonoscopy according to claim 9, wherein said step of generating a fly path comprises:
   partitioning the virtual colon lumen into a plurality of segments;
   selecting a point within each segment;
   centering each point with respect to the wall of the virtual colon lumen; and
   connecting the centered points to establish the fly path.

13. The method of performing virtual colonoscopy according to claim 9, wherein said step of applying at least one transfer function comprises:
   selecting a view point within the colon;
   casting rays from the view point through each image pixel;
   determining a distance from the view point to a wall of the colon lumen along each ray;
   if the distance exceeds a sampling interval, jumping along the ray by the distance and assigning an open space transfer function to the points along the ray over the distance;
   if the distance does not exceed the sampling interval, assigning a transfer function based on a sampling of the pixel value.

14. The method of performing virtual colonoscopy according to claim 9, further comprising the step of dynamically altering the transfer function of at least a portion of the colon lumen to selectively alter the opacity of the region being viewed.

15. A system for three dimensional imaging, navigation and examination of a region comprising:
   an imaging scanner for acquiring image data;
   a processor, said processor converting the image data into a plurality of volume elements forming a volume element data set, the processor performing the further steps of:
      identifying those volume units representing a wall of the colon lumen;
      establishing a fly-path for navigating through said colon lumen; and
      applying at least one transfer function to map color and opacities to the wall of the colon lumen; and
   a display unit operatively coupled to the processor for displaying a representation of the region in accordance with the fly-path and the at least one transfer function.

16. A computer-based system for virtual examination, comprising:
   a bus structure;
   a scanner interface board, said scanner interface board being coupled to said bus structure and providing data from an imaging scanner thereto;
   main memory coupled to the bus;
   a volume renderinig board having local volume rendering memory, said volume rendering data receiving at least a portion of the data from the imaging scanner and storing said data in the volume rendering memory during a volume rendering operation;
   a graphics board coupled to the bus structure;
   a display device coupled to the graphics board; and
   a processor, said processor being operatively coupled to the bus structure and being responsive to the data from the imaging scanner, said processor converting the data from the imaging scanner into a volume element representation, storing the volume element representation, partitioning the volume element representation into image slices, and transferring the volume element partitions to said volume rendering board.

* * * * *

UNITED STATES PATENT AND TRADEMARK OFFICE
CERTIFICATE OF CORRECTION

PATENT NO. : 6,343,936 B1
DATED : February 5, 2002
INVENTOR(S) : Kaufman et al.

It is certified that error appears in the above-identified patent and that said Letters Patent is hereby corrected as shown below:

<u>Title page,</u>
Item [56], References Cited, OTHER PUBLICATIONS,
Under Liang, "colonscopy" should read -- colonoscopy --
Under Valev, "colongraphy" should read -- colonography --
Under Hagen, "Visulatization" should read -- Visualization --
Under Vining, "Admininstrators" should read -- Administrators --

<u>Drawings,</u>
Figure 15, "FEATURS" should read -- FEATURE --

<u>Column 1,</u>
Line 10, "continuation in part" should read -- continuation-in-part --
Line 12, "Three Dimensional" should read -- Three-Dimensional --
Line 15, "Three Dimen-" should read -- Three-Dimen- --
Line 56, "foncd" should read -- formed --

<u>Column 3,</u>
Line 21, "perfonring" should read -- performing --
Line 25, "detemnined" should read -- determined --

<u>Column 4,</u>
Line 39, "recieves" should read -- receives --
Line 56, "on" should read -- in --

<u>Column 5,</u>
Line 58, "and" should be deleted
Line 60, "date." should read -- date; --
Line 62, "ftst" should read -- fast --
Line 67, "technique." should read -- technique; --

UNITED STATES PATENT AND TRADEMARK OFFICE
CERTIFICATE OF CORRECTION

PATENT NO. : 6,343,936 B1
DATED : February 5, 2002
INVENTOR(S) : Kaufman et al.

It is certified that error appears in the above-identified patent and that said Letters Patent is hereby corrected as shown below:

Column 6,
Line 3, "22." should read -- 22; --
Line 6, "therein." should read -- therein; --
Line 9, "technique." should read -- technique; --
Line 11, "architecture." should read -- architecture; and --
Line 12, "perfoming" should read -- performing --
Line 31, TIhis" should read -- This --
Line 36, "Golytcly." should read -- Golytely. --
Line 41, "Dependinig" should read -- Depending --
Line 66, "Conveciting" should read -- Converting --

Column 7,
Line 1, "Dimensioiial" should read -- Dimensional --
Line 2, "Dimensionial" should read -- Dimensional --
Line 5, "three-dimension" should read -- three-dimensional --
Line 34, "coordiantes" should read -- coordinates --
Line 39, "Perfoming" should read -- Performing --
Line 42, "temined" should read -- termined --
Line 46, "examinations" should read -- examination --
Line 53, "achieving," should read -- achieving --
Line 59, "iniside" should read -- inside --
Line 66, "describe" should read -- describes --

Column 8,
Line 8, "Alternatively" should read -- Alternatively --
Line 30, "rcgion" should read -- region --

UNITED STATES PATENT AND TRADEMARK OFFICE
CERTIFICATE OF CORRECTION

PATENT NO.    : 6,343,936 B1                                         Page 3 of 7
DATED         : February 5, 2002
INVENTOR(S)   : Kaufman et al.

It is certified that error appears in the above-identified patent and that said Letters Patent is hereby corrected as shown below:

Column 9,
Equation (2), "$m\dot{r}^2$" should read -- $mr^2$ --
Line 19, "the" (second occurrence) should read -- of the --
Equation (4), "Φ" should read -- φ --
Line 25, "perfoned" should read -- performed --
Line 26, "extemal" should read -- external --
Line 30, "$F_t$" should read -- $F_y$ --

Equation (5), "$kx_1$" should read -- $k\dot{x}_1$ --; and "$kx_2$" should read -- $k\dot{x}_2$ --

Line 42, "extenial" should read -- external --
Line 50, "as:" should read -- are: --
Equation (6), "$F_y\cos\theta\sin\phi - F_x\sin\theta$)," should read -- $F_y\cos\theta\sin\phi - F_z\sin\theta$), --

Column 10,
Line 18, "θ" (third occurrence) should read -- $\ddot{\theta}$ --

Line 24, "φ" should read -- $\ddot{\phi}$ --

Line 59, "Φ" should read -- φ --; and "θ" (third occurrence) should read -- φ --

Column 11,
Line 21, "q(t)" should read -- $\dot{q}(t)$ --

Line 46, "dcsignated" should read -- designated --
Line 48, "scanncd" should read -- scanned --; and "usling" should read -- using --
Line 57, "detemine" should read -- determine --
Line 65, "Thlen" should read -- Then --

Column 12,
Line 7, "dcsired" should read -- desired --
Line 16, "ln" should read -- In --
Line 52, "tle" should read -- the --

UNITED STATES PATENT AND TRADEMARK OFFICE
CERTIFICATE OF CORRECTION

PATENT NO. : 6,343,936 B1
DATED : February 5, 2002
INVENTOR(S) : Kaufman et al.

It is certified that error appears in the above-identified patent and that said Letters Patent is hereby corrected as shown below:

Column 13,
Line 18, "Thie" should read -- The --
Line 45, "interscctioin" should read -- intersection --
Line 46, "lining" should read -- ining --; and "cdge" should read -- edge --
Line 67, "poital" should read -- portal --

Column 14,
Line 1, "detennined" should read -- determined --

Column 15,
Line 4, "has" should read -- have --

Column 16,
Line 2, "bowcl" should read -- bowel --
Line 27, "Altematively" should read -- Alternatively --
Line 30, "tenninal" should read -- terminal --

Column 17,
Line 53, "Diaz-" should read -- Dia- --

Column 18,
Line 10, "ma" should read -- mA --
Line 27, "voxci" should read -- voxel --

Column 19,
Line 24, "foni" should read -- form --
Line 37, "imagc" should read -- image --
Line 41, "1570)" should read -- 1560) --

Column 20,
Line 17, "α" (both occurrences) should read -- a --

Line 25, "α$_{k+1}$ = X$_i$;" should read -- $a_{\bar{k}+1} = X_i$; --

Line 27, "n$_{k+1}$ = 1;" should read -- $n_{\bar{k}+1} = 1$; --

Line 28, "$\overline{K} = \bar{K}+1;$" should read -- $\overline{K} = \overline{K}+1$; --

Line 64, "averagye" should read -- average --

UNITED STATES PATENT AND TRADEMARK OFFICE
CERTIFICATE OF CORRECTION

PATENT NO. : 6,343,936 B1
DATED : February 5, 2002
INVENTOR(S) : Kaufman et al.

It is certified that error appears in the above-identified patent and that said Letters Patent is hereby corrected as shown below:

Column 21,
Line 1, "arc" should read -- are --
Line 46, "imagc" should read -- image --
Line 66, "reions." should read -- regions. --

Column 22,
Line 23, "inspcct" should read -- inspect --
Line 41, "perfoiming" should read -- performing --
Line 47, "infonation" should read -- information --

Column 23,
Line 47, "fiom" should read -- from --
Line 50, "mannier." should read -- manner. --

Column 24,
Line 17, "gausiani" should read -- Gaussian --
Line 19, "laplacian" should read -- Laplacian --
Line 20, "multiresolutional" should read -- multiresolutional --
Line 43, "Gausian" should read -- Gaussian --
Line 45, "performcd" should read -- performed --

Column 25,
Line 2, "relions" should read -- regions --
Line 18, "lreater" should read -- greater --
Line 26, "neighborinig" should read -- neighboring --
Line 35, "infonnation" should read -- information --
Line 55, "contributioni" should read -- contribution --

Column 27,
Line 14, "fiom" should read -- from --
Line 63, "physically-based" should read -- physically based --
Line 63, "defoimable" should read -- deformable --

UNITED STATES PATENT AND TRADEMARK OFFICE
CERTIFICATE OF CORRECTION

PATENT NO.    : 6,343,936 B1
DATED         : February 5, 2002
INVENTOR(S)   : Kaufman et al.

It is certified that error appears in the above-identified patent and that said Letters Patent is hereby corrected as shown below:

Column 28,
Line 14, "MHZ." should read -- MHz. --
Line 19, "perfonn" should read -- perform --
Line 22, "foni" should read -- form --
Line 45, "chalrt" should read -- chart --
Line 46, "perfonred" should read -- performed --

Column 29,
Line 37, "frequencies;" should read -- frequencies; and --
Line 48, "fly path" should read -- fly-path --
Line 49, "perfonuing" should read -- performing --
Line 57, "assigining" should read -- assigning --
Line 59, "distance," should read -- distance; and --
Line 61, "determininig" should read -- determining --

Column 30,
Line 6, "irendering" should read -- rendering --
Line 16, "correspondilng" should read -- corresponding --
Line 33, "perfor-mining" should read -- performing --
Line 38, "represeniting" should read -- representing --
Line 45, "lumen;" should read -- lumen; and --
Line 46, "fly path" should read -- fly-path --
Line 59, "lumen;" should read -- lumen; and --
Line 67, "sets;" should read -- sets; and --

Column 31,
Line 4, "fly" should read -- fly- --
Line 11, "fly path." should read -- fly-path. --
Line 22, "distance;" should read -- distance; and --
Line 32, "three dimensional" should read -- three-dimensional --

UNITED STATES PATENT AND TRADEMARK OFFICE
CERTIFICATE OF CORRECTION

PATENT NO. : 6,343,936 B1
DATED : February 5, 2002
INVENTOR(S) : Kaufman et al.

It is certified that error appears in the above-identified patent and that said Letters Patent is hereby corrected as shown below:

Column 32,
Line 4, "and" should be deleted
Line 20, "renderinig" should read -- rendering --

Signed and Sealed this

Twenty-ninth Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,343,936 B1
DATED         : February 5, 2002
INVENTOR(S)   : Kaufman et al.

It is certified that error appears in the above-identified patent and that said Letters Patent is hereby corrected as shown below:

Column 1,
Lines 1-5, after the Title, insert:

-- STATEMENT OF GOVERNMENT RIGHTS
    Work related to the present invention was supported by grants from the National Institute of Health, Grant Nos. NIH R21 CA79180, Automatic Colon Segmentation for 3D Virtual Colonoscopy; and NIH R01 CA82402, Developing Virtual Colonoscopy for Cancer Screening. The United States Government may have rights to the invention. --

Signed and Sealed this

Sixteenth Day of December, 2003

JAMES E. ROGAN
*Director of the United States Patent and Trademark Office*